(12) United States Patent
Fermann

(10) Patent No.: US 9,153,929 B2
(45) Date of Patent: Oct. 6, 2015

(54) MODE-LOCKED MULTI-MODE FIBER LASER PULSE SOURCE

(71) Applicant: IMRA AMERICA, INC., Ann Arbor, MI (US)

(72) Inventor: Martin E. Fermann, Dexter, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 0 days.

(21) Appl. No.: 14/517,107

(22) Filed: Oct. 17, 2014

(65) Prior Publication Data

US 2015/0036702 A1 Feb. 5, 2015

Related U.S. Application Data

(63) Continuation of application No. 09/785,944, filed on Feb. 16, 2001, now Pat. No. 8,873,593, which is a continuation of application No. 09/199,728, filed on Nov. 25, 1998, now Pat. No. 6,275,512.

(51) Int. Cl.
*H01S 3/30* (2006.01)
*H01S 3/067* (2006.01)
(Continued)

(52) U.S. Cl.
CPC .............. *H01S 3/06716* (2013.01); *G02B 6/26* (2013.01); *H01S 3/067* (2013.01); *H01S 3/06708* (2013.01); *H01S 3/06737* (2013.01); *H01S 3/06783* (2013.01); *H01S 3/08045* (2013.01);
(Continued)

(58) Field of Classification Search
CPC .......... H01S 3/06737; H01S 3/094007; H01S 3/06716; H01S 3/06708; H01S 3/067

USPC ............................................................ 372/6
See application file for complete search history.

(56) References Cited

U.S. PATENT DOCUMENTS 3,308,394 A 3/1967 Snitzer
3,350,654 A 10/1967 Snitzer
(Continued)

FOREIGN PATENT DOCUMENTS

DE 28 44 129 A1 4/1980
DE 2844129 A1 4/1980
(Continued)

OTHER PUBLICATIONS

"Laser Backreflection—The Bane of Good Performance," Fiber-Optics.Info, downloaded from http://www.fiber-optics.info/articles/laser_backreflection_-_the_bane_of_good_performance, Mar. 5, 2015.
(Continued)

*Primary Examiner* — Kinam Park
(74) *Attorney, Agent, or Firm* — Sughrue Mion, PLLC; Richard C. Turner

(57) ABSTRACT

A laser utilizes a cavity design which allows the stable generation of high peak power pulses from mode-locked multi-mode fiber lasers, greatly extending the peak power limits of conventional mode-locked single-mode fiber lasers. Mode-locking may be induced by insertion of a saturable absorber into the cavity and by inserting one or more mode-filters to ensure the oscillation of the fundamental mode in the multi-mode fiber. The probability of damage of the absorber may be minimized by the insertion of an additional semiconductor optical power limiter into the cavity.

9 Claims, 11 Drawing Sheets

(51) Int. Cl.
  *G02B 6/26* (2006.01)
  *H01S 3/08* (2006.01)
  *H01S 3/11* (2006.01)
  *H01S 3/094* (2006.01)
  *H01S 3/16* (2006.01)
  *H01S 3/00* (2006.01)

(52) U.S. Cl.
  CPC ............ *H01S 3/1106* (2013.01); *H01S 3/0092* (2013.01); *H01S 3/06712* (2013.01); *H01S 3/06725* (2013.01); *H01S 3/06729* (2013.01); *H01S 3/06745* (2013.01); *H01S 3/094007* (2013.01); *H01S 3/1109* (2013.01); *H01S 3/1115* (2013.01); *H01S 3/1608* (2013.01); *H01S 3/1618* (2013.01)

(56) References Cited

U.S. PATENT DOCUMENTS

| | | |
|---|---|---|
| 3,355,674 A | 11/1967 | Hardy |
| 3,395,366 A | 7/1968 | Snitzer |
| 3,599,106 A | 8/1971 | Snitzer |
| 3,687,514 A | 8/1972 | Miller |
| 3,761,716 A | 9/1973 | Kapron |
| 3,777,149 A | 12/1973 | Marcatili |
| 3,779,628 A | 12/1973 | Kapron et al. |
| 3,808,549 A | 4/1974 | Maurer |
| 3,826,992 A | 7/1974 | Friedl |
| 3,859,073 A | 1/1975 | Schultz |
| 3,955,921 A | 5/1976 | Tensmeyer |
| 3,973,828 A | 8/1976 | Onoda et al. |
| 4,050,782 A | 9/1977 | Uchida |
| 4,120,587 A | 10/1978 | Vali |
| 4,204,745 A | 5/1980 | Sakai |
| 4,260,221 A | 4/1981 | Marcuse |
| 4,447,125 A | 5/1984 | Lazay et al. |
| 4,465,334 A | 8/1984 | Siemsen et al. |
| 4,479,220 A | 10/1984 | Bor et al. |
| 4,504,111 A | 3/1985 | Hunzinger |
| 4,515,431 A | 5/1985 | Shaw et al. |
| 4,546,476 A | 10/1985 | Shaw et al. |
| 4,553,238 A | 11/1985 | Shaw et al. |
| 4,637,025 A | 1/1987 | Snitzer et al. |
| 4,680,767 A | 7/1987 | Hakimi et al. |
| 4,712,075 A | 12/1987 | Snitzer |
| 4,723,828 A | 2/1988 | Garel-Jones |
| 4,780,877 A | 10/1988 | Snitzer |
| 4,782,491 A | 11/1988 | Snitzer |
| 4,787,927 A | 11/1988 | Mears et al. |
| 4,815,079 A | 3/1989 | Snitzer et al. |
| 4,817,205 A | 3/1989 | Asawa |
| 4,829,529 A | 5/1989 | Kafka |
| 4,832,437 A | 5/1989 | Kim et al. |
| 4,835,778 A | 5/1989 | Kafka et al. |
| 4,896,942 A | 1/1990 | Onstott et al. |
| 4,913,520 A | 4/1990 | Kafka |
| 4,923,279 A | 5/1990 | Ainslie |
| 4,944,591 A | 7/1990 | McMichael |
| 4,955,014 A | 9/1990 | Kuppers |
| 4,991,923 A | 2/1991 | Kino et al. |
| 5,007,059 A | 4/1991 | Keller et al. |
| 5,032,001 A | 7/1991 | Shang |
| 5,036,220 A | 7/1991 | Byer et al. |
| 5,067,134 A | 11/1991 | Oomen |
| 5,074,633 A | 12/1991 | Cohen et al. |
| 5,077,483 A | 12/1991 | Cloonan |
| 5,077,815 A | 12/1991 | Yoshizawa |
| 5,084,880 A | 1/1992 | Esterowitz et al. |
| 5,121,460 A | 6/1992 | Tumminelli |
| 5,161,050 A | 11/1992 | Grasso et al. |
| 5,170,458 A | 12/1992 | Aoyagi et al. |
| 5,175,785 A | 12/1992 | Dabby |
| 5,187,759 A | 2/1993 | DiGiovanni et al. |
| 5,208,699 A | 5/1993 | Rockwell et al. |
| 5,226,049 A | 7/1993 | Grubb |
| 5,253,322 A | 10/1993 | Onishi |
| 5,263,036 A | 11/1993 | De Bernardi et al. |
| 5,319,652 A | 6/1994 | Moeller |
| 5,321,718 A | 6/1994 | Waarts et al. |
| 5,333,089 A | 7/1994 | Heidemann |
| 5,349,602 A | 9/1994 | Mehuys et al. |
| 5,353,363 A | 10/1994 | Keck |
| 5,363,234 A | 11/1994 | Newhouse |
| 5,363,386 A | 11/1994 | Smith |
| 5,381,431 A | 1/1995 | Zayhowski |
| 5,388,120 A | 2/1995 | Ackley |
| 5,400,350 A | 3/1995 | Galvanauskas |
| 5,414,725 A | 5/1995 | Fermann et al. |
| 5,416,862 A | 5/1995 | Haas |
| 5,422,897 A | 6/1995 | Wyatt et al. |
| 5,440,573 A | 8/1995 | Fermann |
| 5,450,427 A | 9/1995 | Fermann et al. |
| 5,452,394 A | 9/1995 | Huang |
| 5,479,422 A | 12/1995 | Fermann et al. |
| 5,488,619 A | 1/1996 | Injeyan |
| 5,498,935 A | 3/1996 | McMahan et al. |
| 5,499,134 A | 3/1996 | Galvanauskas et al. |
| 5,508,845 A | 4/1996 | Frisken |
| 5,511,083 A | 4/1996 | D'Amato |
| 5,513,196 A | 4/1996 | Bischel et al. |
| 5,517,525 A | 5/1996 | Endo et al. |
| 5,539,571 A | 7/1996 | Welch |
| 5,541,947 A | 7/1996 | Mourou et al. |
| 5,546,415 A | 8/1996 | Delfyett |
| 5,559,816 A | 9/1996 | Basting et al. |
| 5,572,618 A | 11/1996 | DiGiovanni |
| 5,574,739 A | 11/1996 | Carruthers et al. |
| 5,585,913 A | 12/1996 | Hariharan et al. |
| 5,627,848 A | 5/1997 | Fermann et al. |
| 5,627,854 A | 5/1997 | Knox |
| 5,633,885 A | 5/1997 | Galvanauskas et al. |
| 5,659,558 A | 8/1997 | Tohmon et al. |
| 5,659,644 A | 8/1997 | DiGiovanni |
| 5,663,731 A | 9/1997 | Theodoras, II et al. |
| 5,677,769 A | 10/1997 | Bendett |
| 5,689,519 A | 11/1997 | Fermann |
| 5,696,782 A | 12/1997 | Harter et al. |
| 5,701,319 A | 12/1997 | Fermann |
| 5,756,209 A | 5/1998 | Hale |
| 5,774,484 A | 6/1998 | Wyatt et al. |
| 5,815,307 A | 9/1998 | Arbore et al. |
| 5,818,630 A | 10/1998 | Fermann et al. |
| 5,828,802 A | 10/1998 | Stolen |
| 5,838,702 A | 11/1998 | Byer et al. |
| 5,841,797 A | 11/1998 | Ventrudo et al. |
| 5,844,927 A | 12/1998 | Kringlebotn |
| 5,847,863 A | 12/1998 | Galvanauskas et al. |
| 5,854,865 A | 12/1998 | Goldberg |
| 5,861,970 A | 1/1999 | Tatham et al. |
| 5,862,287 A | 1/1999 | Stock et al. |
| 5,867,304 A | 2/1999 | Galvanauskas et al. |
| 5,867,305 A | 2/1999 | Waarts et al. |
| 5,880,877 A | 3/1999 | Fermann et al. |
| 5,887,009 A | 3/1999 | Mandella |
| 5,905,745 A | 5/1999 | Grubb et al. |
| 5,920,668 A | 7/1999 | Uehara et al. |
| 5,923,684 A | 7/1999 | DiGiovanni |
| 5,923,686 A | 7/1999 | Fermann et al. |
| 5,953,353 A | 9/1999 | Headley |
| 5,966,491 A | 10/1999 | DiGiovanni |
| 5,974,060 A | 10/1999 | Byren |
| 5,993,899 A | 11/1999 | Robin |
| 5,999,673 A | 12/1999 | Valentin et al. |
| 6,014,249 A | 1/2000 | Fermann et al. |
| 6,020,591 A | 2/2000 | Harter et al. |
| 6,031,849 A | 2/2000 | Ball |
| 6,034,975 A | 3/2000 | Harter et al. |
| 6,044,188 A | 3/2000 | Kropp |
| 6,064,786 A | 5/2000 | Cunningham |
| 6,072,811 A | 6/2000 | Fermann et al. |
| 6,081,369 A | 6/2000 | Waarts et al. |
| 6,097,741 A | 8/2000 | Lin |
| 6,104,733 A | 8/2000 | Espindola et al. |

(56) References Cited

U.S. PATENT DOCUMENTS

| | | | |
|---|---|---|---|
| 6,141,143 A | 10/2000 | Marshall | |
| 6,144,484 A | 11/2000 | Marshall | |
| 6,154,310 A | 11/2000 | Galvanauskas et al. | |
| 6,157,763 A | 12/2000 | Grubb | |
| 6,181,463 B1 | 1/2001 | Galvanauskas et al. | |
| 6,185,346 B1 | 2/2001 | Asawa | |
| 6,188,705 B1 | 2/2001 | Krainak et al. | |
| 6,198,568 B1 | 3/2001 | Galvanauskas et al. | |
| 6,208,458 B1 | 3/2001 | Galvanauskas et al. | |
| 6,212,216 B1 | 4/2001 | Pillai | |
| 6,236,498 B1 | 5/2001 | Freeman et al. | |
| 6,236,793 B1 | 5/2001 | Lawrence et al. | |
| 6,249,630 B1 | 6/2001 | Stock et al. | |
| 6,252,892 B1 | 6/2001 | Jiang et al. | |
| 6,275,512 B1 | 8/2001 | Fermann | |
| 6,295,161 B1 | 9/2001 | Bazzocchi | |
| 6,301,271 B1 | 10/2001 | Sanders | |
| 6,303,041 B1 | 10/2001 | Laming | |
| 6,304,352 B1 | 10/2001 | Cunningham | |
| 6,320,885 B1 | 11/2001 | Kawai et al. | |
| 6,324,326 B1 | 11/2001 | Dejneka et al. | |
| 6,327,403 B1 | 12/2001 | Danziger | |
| 6,334,011 B1 | 12/2001 | Galvanauskas et al. | |
| 6,356,680 B1 | 3/2002 | Kirk | |
| 6,373,867 B1 | 4/2002 | Lin et al. | |
| 6,415,076 B1 | 7/2002 | DeCusatis | |
| 6,427,491 B1 | 8/2002 | Burke | |
| 6,434,311 B1 | 8/2002 | Danziger | |
| 6,496,301 B1 | 12/2002 | Koplow et al. | |
| 6,501,884 B1 | 12/2002 | Golowich | |
| 6,510,265 B1 | 1/2003 | Giaretta et al. | |
| 6,549,547 B2 | 4/2003 | Galvanauskas et al. | |
| 6,567,583 B2 | 5/2003 | Mettler et al. | |
| 6,574,406 B2 | 6/2003 | Ainslie | |
| 6,751,388 B2 | 6/2004 | Siegman | |
| 6,885,683 B1 | 4/2005 | Fermann et al. | |
| 6,954,575 B2 | 10/2005 | Fermann et al. | |
| 6,956,887 B2 | 10/2005 | Jiang | |
| 6,987,783 B2 | 1/2006 | Fajardo | |
| 7,212,745 B2 | 5/2007 | Numata et al. | |
| 7,593,435 B2 | 9/2009 | Gapontsev et al. | |
| 8,654,800 B2 | 2/2014 | Yagodkin et al. | |
| 8,761,211 B2* | 6/2014 | Fermann et al. | 372/6 |
| 8,873,593 B2 | 10/2014 | Fermann | |
| 2001/0024458 A1* | 9/2001 | Fermann | 372/6 |
| 2002/0138069 A1 | 9/2002 | Peyman | |
| 2003/0202547 A1 | 10/2003 | Fermann et al. | |
| 2004/0036957 A1 | 2/2004 | Galvanauskas et al. | |
| 2005/0008044 A1 | 1/2005 | Fermann et al. | |
| 2005/0069269 A1 | 3/2005 | Libori | |
| 2005/0218122 A1 | 10/2005 | Yamamoto et al. | |
| 2006/0120418 A1 | 6/2006 | Harter et al. | |
| 2010/0166026 A1 | 7/2010 | Klebanov | |
| 2014/0192403 A1 | 7/2014 | Fermann et al. | |

FOREIGN PATENT DOCUMENTS

| | | |
|---|---|---|
| DE | 44 27 0005 A1 | 2/1995 |
| DE | 199556739 B4 | 2/2010 |
| EP | 0 208 189 A2 | 1/1987 |
| EP | 0 103 382 B1 | 9/1989 |
| EP | 0442553 | 8/1991 |
| EP | 0320990 B1 | 9/1992 |
| EP | 0657974 A2 | 6/1995 |
| EP | 0704944 A1 | 4/1996 |
| EP | 0 569 174 B1 | 7/1996 |
| EP | 0569174 B1 | 7/1996 |
| EP | 0801827 B1 | 10/1998 |
| EP | 01662624 A1 | 5/2006 |
| FR | 2 441 858 | 6/1980 |
| FR | 2441858 | 6/1980 |
| JP | 54121749 A | 9/1979 |
| JP | S54-121749 A | 9/1979 |
| JP | 61-065208 | 4/1986 |
| JP | 61065208 | 4/1986 |
| JP | 62-54986 | 3/1987 |
| JP | 63-034521 | 2/1988 |
| JP | 63034521 | 2/1988 |
| JP | 02-039110 A | 2/1990 |
| JP | 03-053205 A | 3/1991 |
| JP | H03-238883 | 10/1991 |
| JP | 3253823 A | 11/1991 |
| JP | H03-253823 A | 11/1991 |
| JP | 04-273187 | 9/1992 |
| JP | 4253003 | 9/1992 |
| JP | H04-253003 | 9/1992 |
| JP | H04-298724 | 10/1992 |
| JP | 04-322228 | 12/1992 |
| JP | 04-507299 | 12/1992 |
| JP | H05-341335 | 12/1993 |
| JP | 6059150 A | 3/1994 |
| JP | H06-059150 A | 3/1994 |
| JP | H06-283798 | 10/1994 |
| JP | H07-142798 | 6/1995 |
| JP | H07-231131 | 8/1995 |
| JP | 07-245439 | 9/1995 |
| JP | H07-253559 | 10/1995 |
| JP | 08-018137 | 1/1996 |
| JP | 08018137 | 1/1996 |
| JP | H08-501159 | 2/1996 |
| JP | H8-228038 A | 3/1996 |
| JP | H08-228038 A | 3/1996 |
| JP | 08-304857 | 11/1996 |
| JP | H8-340141 A | 12/1996 |
| JP | H08-340141 A | 12/1996 |
| JP | H09-167869 A | 6/1997 |
| JP | H09-508239 A | 8/1997 |
| JP | H10-186424 A | 7/1998 |
| JP | H11-74593 | 3/1999 |
| WO | WO 8705118 A1 | 8/1987 |
| WO | WO 8910332 A1 | 11/1989 |
| WO | WO 92/16037 | 9/1992 |
| WO | WO9315536 | 8/1993 |
| WO | WO 94/04365 | 3/1994 |
| WO | WO 95/10868 | 4/1995 |
| WO | WO 95/20831 | 8/1995 |
| WO | WO 95/20831 A1 | 8/1995 |
| WO | WO 97/21124 A1 | 6/1997 |
| WO | WO 9726571 A2 | 7/1997 |
| WO | WO 9842050 A1 | 9/1998 |

OTHER PUBLICATIONS

Smith, A. V., et al., "Mode instability in high power fiber amplifiers," Optics Express, vol. 19, No. 11, pp. 10180-10192, May 9, 2011.
Limpert et al., "The rising power of fiber laser and amplifiers", IEEE Journal of Selected Topics in Quantum Electronics, vol. 12, No. 3, pp. 537-545, May/Jun. 2007.
Stellwag Jr., W. L., "Fiber laser welding of 304 stainless steel and the effects of various parameters on materials coupling and back-reflection," M.S. Thesis, Ohio State University, 2012.
English translation of patent claims in JP Pat. No. 4668378, issued Jan. 21, 2011, to IMRA America, Inc.
English translation of patent claims in JP Pat. No. 5661088, issued Dec. 12, 2014, to IMRA America, Inc.
English translation of Appeal Decision in Dissatisfaction No. 2010-800095 for JP Pat. No. 3990034, owned by IMRA America, Inc., Jan. 15, 2015.
Office Action dated Feb. 26, 2015, in U.S. Appl. No. 14/223,287, filed Mar. 24, 2014, in 61 pages.
Alcock et al., Q-switched Operation of a neodymium-doped monomode fibre laser, L. P. Alcock; A. C. Trapper; A. I. Ferguson; D. C. Hanna, Electronics Letters, vol. 22 Is. 2 p. 84-85 (Jan. 1986).
Arbore et al. Frequency doubling of femtosecond erbium-fiber soliton lasers in periodically poled lithium niobate, Optics Letters, vol. 22, No. 1, Jan. 1, 1997, pp. 13-15. (3 pages).
Digonnet et al., Nd:YAG single crystal fiber lasers, M. J. F. Digonnet; H. J. Shaw, Second European Conference on Integrated Optics (Oct. 1983).
Fermann et al. "Ultra-wide tunable Er soliton fiber laser amplified in Yb-doped fiber", M. E. Fermann, A. Galvanauskas, M. L. Stock, K.

(56) References Cited

OTHER PUBLICATIONS

K. Wong, D. Harter, L. Goldberg, Optics Letters vol. 24, No. 20 p. 1428-30, Oct. 1999.
Imasaka, T.., Optical Chromatography. A new tool for separation of particles, T. Imasaka Analusis Magazine 1998, 26, No. 5 p. M53.
Koplow et al. Single-mode operation of a coiled multimode fiber amplifier, Koplow et al. Optics letter vol. 25, p. 442—Apr. 2000.
Morkel et al. Theoretical modeling of erbium-doped fiber amplifiers with excited-state absorption, P. Morkel, Optics Letters, vol. 14, Is. 19, pp. 1062-1064 Oct. 1989.
Nelson et al. Efficient frequency doubling of a femsecond fiber laser, L. Nelson, Optics Letters, vol. 21, Is.21, pp. 1759-1761 (Nov. 1, 1996).
Nilsson et al., Modeling and optimization of low-repetition-rate high-energy pulse amplification in cw-pumped erbium-doped fiber amplifiers, J. Nilsson; B. Jaskorzynska, Optics Letters, vol. 18 Is. 24 p. 2099-2101 (Dec. 1993).
Ober et al., Widely tunable femtosecond neodymium fiber laser, M.H. Ober et al., Optics Letters vol. 20, No. 22 Nov. 15, 1995, p. 2303.
Richardson et. al., Fiber laser systems shine brightly, Richardson, D; Minelly, J; Hanna, D, Laser Focus World vol. 33 Is 9 p. 87 Sep. 1997.
Ripin et al. High efficiency side-pumping of light into Optical fibers using imbedded V-Groves, by Ripin and goldberg, Elect. Let, vol. 31, p. 2204-2205 Dec. 1995.
Ross et al., Optical amplification of 1.06-u InAs . . . Injection-laser emission, B. Ross; E. Snitzer, IEEE QE, vol. QE-6 Is. 6 p. 361-366 ( Jun. 1970).
Senior, J. Optical Fiber Communications: Principles and Practices, Prentice/Hall International pp. 41-42, 73-76, 138-144 (1985).
Siegman, A.E, Defining, measuring, and optimizing laser beam quality, A. E. Siegman, SPIE, vol. 1868, Jan. 1993.
Snitzer et al., Proposed fiber cavities for optical masers, E. Snitzer, JOAP, vol. 32 Is. 1 p. 36-39 (Jan. 1961).
Sousa et al. Multimode Er-doped fiber for single-transverse-mode amplification, J.M Sousa, O. G. Okhotnikov, Applied Physics Letters vol. 74, No. 11, p. 1528-30 Mar. 1999.
Spielmann et al. Ultrabroadband femtosecond lasers, C. Spielmann, IEEE J. Quantum Elec. vol. 30, Is. 1100, Apr. (1994).
Stone et al., Neodymium-doped silica lasers in end-pumped fiber geometry, J. Stone; C. A. Burrus, Applied Physics Letters, vol. 23 Is. 7 p. 388-389 (Oct. 1973).
Tajima et al. Er3+-Doped single-polarisation optical fibres, K. Jajima, Electronic Letters, vol. 26, Is. 18, pp. 1498-1499 (Aug. 30, 1990).
Yamada et al. First-order quasi-phase matched LiNbO3 waveguide periodically poled by applying an external field for efficient blue second-harmonic generation, Appl. Phys. Lett, vol. 62, p. 436, Feb. 1993.
Fermann, et al., File history of U.S. No. Appl. 08/882,349, filed Jun. 25, 1997, issued as U.S. Pat. No. 5,818,630 on Oct. 6, 1998.
Fermann, et al., File History of U.S. Appl. No. 09/809,248, filed Mar. 16, 2001, issued as U.S. Pat. No. 6,954,575 on Oct. 11, 2005.
Fermann, et al., File History of U.S. Appl. No. 10/850,509, filed May 20, 2004, now abandoned.
A. Galvanauskas et al., "Generation of femtosecond optical pulses with nanojoule energy from a diode laser and fiber based system," App. Physics Letters, vol. 63, No. 13, pp. 1742-1744, Sep. 27, 1993.
A. Galvanauskas: "Compact ultrahigh-power laser systems", SPIE vol. 2377, S-117 to S-126 Apr. 1995.
H.A. Haus et al., "Self-Starting of passively mode-locked lasers," Optics Letters, vol. 16, No. 17, Sep. 1, 1991, pp. 1331-1333.
H. Lin et al., "Colliding-pulse mode-locked lasers using Er-doped fiber and a semiconductor saturable absorber," CLEO 1995 paper JTuE1.
D. B. Mortimore, et al, "Low-Loss Joints between Dissimilar Fibres by Tapering Fusion splices," Electronics Letters, vol. 22, No. 6, pp. 316-319, Mar. 13, 1986.
English translation of Office Action mailed Dec. 15, 2008 for Japanese Application No. H11-334914.
English translation of Office Action dated Feb. 3, 2009 for German Application No. 199 56 739.5-54.
Office Action dated Feb. 6, 2009 for German Application No. DE199 61 376.8-54.
Office Action dated Mar. 9, 2009 for German Application No. 198 61 429.2-54.
International Search Report and Written opinion for International Appl. No. PCT/US2008/074668 dated Jan. 27, 2009.
B.J. Ainslie et al.; "The absorption and fluorescence spectra of rare-earth ions in silica-based monomode fiber," J. Lightwave Technol. 6, 287-293 1988.
Alvarez-Chavez et al.; "Mode selection in high power cladding pumped fibre lasers with tapered selection", Conf. on Lasers & Electro-Optics Tech. Digest 1999, paper CWE7.
S. Aramaki et al.; "Revised Phase Diagram for the system Al2O3—SiO2", J of the American Ceramic Society vol. 45 Is May 5, 1962 p. 229-242.
Y. Beaudoin et al.; "Ultrahigh-contrast Ti:sapphire/Nd:glass terawatt laser system", Optics Letters, vol. 17, Iss. 12, pp. 865-867 (1992).
A.L.G. Carter et al.; "Flash-condensation technique for the fabrication of high-phosphorus-content rare-earth-doped fibres", Electronics Letters vol. 28, Is 21,:pp. 2009-2011 Oct. 8, 1992.
M.L. Dennis et al.; 2-W upconversion laser in TM:ZBLAN fiber, Conf. On Lasers & Electro-Optics Cleo Techical Digest vol. 8, p. 41, 1994.
M.L. Dennis et al.; "Upconversion-pumped thulium-fiber laser at 810 nm", Optical Fiber Communications Conference OFC '94 Technical Digest WK10, 1994.
J.A. Dobrowolski et al.; "Colored filter glasses: an intercomparison of glasses made by different manufacturer", Applied Optics, vol. 16, Iss. 6, pp. 1491-1512 (1977).
E. M. Erbe et al.; "Properties of $Sm_2O_3$—$Al_2O_3$—$SiO_2$ glasses for In vivo applications", in Journal American Ceramic Society 73 (9), p. 2708-2713, 1990.
M.C. Farries et al. "A Samarium Doped Visible Glass Laser Operating at 651 nm", Proc. CLEO, Anaheim, California, Paper PD5, pp. 1-2, 1988.
M. C. Farries et al. "The Properties of the Samarium Fibre Laser", Fiber Laser Sources and Amplifiers, SPIE 1171, p. 271-278 1989.
M.C. Farries et al. "$Samarium^{3+}$-Doped Glass Laser Operating at 651 nm", Electronics Letters vol. 24 No. 11. May 26, 1988 p. 709-711.
M.C. Farries et al. "Spectroscopic and Lasing Characteristics of Samarium doped Glass Fibre", IEE Proceedings vol. 137, Pt. J. No. 5 Oct. 1990 p. 318-322.
M.C. Farries et al. "Very high-rejection optical fibre filters", Electronics Letters vol. 22, Is 21 pp. 1126-1128 Oct. 9, 1986.
A. A. Fotiadi, "Dynamics of All-Fiber Self-Q-switched Ytterbium/ Samarium Laser", CLEO 2007 paper CMC4.
Galvanauskaks, "Mode-Scalable Fiber Based Chirped Pulse Amplification Systems", Selected Topics in Quantum Electronics, IEEE Journal on, vol. 7 Issue: 4, Jul./Aug. 2001 pp. 504-517.
D. Gloge, "Weakly Guiding Fibers", Applied Optics vol. 10, No. 10, pp. 2252-2258, Oct. 1971.
J.P. Kohli et al.; "Formation and properties of rare earth aluminosilicate glasses", Kohli J.T., Shelby, J.E. Physics and Chemistry of Glasses 32, Is Jun. 3, pp. 67-71, 1991.
J.P. Kohli et al.; "Magneto-optical properties of rare earth aluminosilicate glasses", Kohli J.T., Shelby, J.E. Physics and Chemistry of Glasses 32, Is 3 (June), pp. 109-114, 1991.
S-K Liaw et al.; "Passive gain-equalized wide-band erbium-doped fiber amplifier using samarium-doped fiber", Photonics Technology Letters, IEEE, vol. 8, Is. 7 pp. 879-881 Jul. 1996.
HR Müller et al., "Fibers for high-power lasers and amplifiers", Comptes Rendus Physique, vol. 7, Issue 2, Mar. 2006, pp. 154-162.
R.A. Myers et al.; "Effect of Hydrogen Loading on Temperature electric-Field Poling of $SIO_2$-Based Thin-Films on Si", Electronics Letters vol. 31 Iss. 18 pp. 1604-1606 Published: Aug. 31, 1995.
R.A. Myers et al.; "Stable second-order nonlinearity in $SiO_2$-based waveguides on Si using temperature/electric-field poling", Proceedings of SPIE 2289, pp. 158-166 (1994).
T.B. Norris "Femtosecond pulse amplification at 250 kHz with a Ti:sapphire regenerative amplifier and application to contionuum generation," Optics Letters vol. 17, No. 14, p. 1009-1011 Jul. 1992.

(56) References Cited

OTHER PUBLICATIONS

R. Paschotta et al.; "Lifetime quenching in Yb-doped fibres", Optics Communications vol. 136, Apr. 1, 1997 p. 375-378.
H. Po et al.; "Double-clad high brightness Nd fiber laser pumped by GaA/As phased array", Proceedings of Optical Fiber Communication '89, Postdeadline paper PD7, 1989.
Reed et al.; "30-FS Pulses Tunable Across the Visible With a 100-Khz Ti-Sapphire Regenerative Amplifier", Optics Letters vol. 20 Is. 6 pp. 605-607 Published: Mar. 15, 1995.
J-K Rhee et al.; "Chirped-pulse amplification of 85-fs pulses at 250 kHz with third-order dispersion compensation by use of holographic transmission gratings", Optics Letters vol. 19 No. 19 Oct. 1, 1004, p. 1550-1552.
C. Rouyer et al.; "Generation of 50-TW femtosecond pulses in a Ti:sapphire/Nd:glass chain", Optics Letters 18 Iss 3 , 214-216 (1993).
U. C. Ryu et al.; "In-line gain control of the erbium doped fiber amplifier using samarium doped inner-cladding cladding in the 1.5 μm region", OSA/ Optical Fiber Communication 2000 paper WA4-1.
A, Saissy et al., Properties of $Sm^{3+}$ ions in Fluorozirconate fiber, Applied Optics vol. 36 No. 24, p. 5931 Aug. 20, 1997.
J. Sakai et al.; "Bending loss of propagation modes in arbitrary-index profile optical fibers", Applied Optics 17, 1499-1506 1978.
S7010N Material Safety Data Sheet for SCHOTT AG, Passive Glasses Laser Cavity Materials, dated Mar. 15, 2001.
S7010N Property Sheet, SCHOTT AG, Passive Glasses Laser Cavity Materials, Mar. 15, 2001.
P. Schultz "Optical Absorption of the Transition elements in Vitreous Silica", J of the American Ceramic Society vol. 57, Is 7 Jul. 1974 p. 309-313.
B. Shiner et al.; "Fibre sources target automotive industry", Opto & Laser Europe, Jan. 7, 2003 article #16625 optics.org.
O. Svelto, "Principles of Lasers", 4th Edition (Translated by D. C. Hanna), p. 480-483 Springer Science and Business Media, Inc. 1998.
L. Tordella et al.; "High repetition rate passively Q-switched $Nd^{3+}:Cr^{4+}$ all-fibre laser", Electronics Letters vol. 39_(2003) pp. 1307-1308.
R.P. Tumminelli et al.; "Integrated-Optic ND-Glass Laser Fabricated by Flame Hydrolysis Deposition Using Chelates", Optics Letters vol. 16 Iss. 14 pp. 1098-1100 Published: Jul. 15, 1991.
R.P. Tumminelli et al.; "Fabrication of High-Concentration Rare-Earth Doped Optical Fibers Using Chelates", J. of Lightwave Tech. vol. 8 Is 11 p. 1680-1683 Nov. 1990.
K. Wakasugi et al.; "Preparation of Glasses Containing Rare Earth Oxide by $CO_2$ Laser", J. of the Soc. of Materials Science, Japan, vol. 55, No. 7, pp. 675-678 Jul. 2006.
M.H. Watanabei et al.; "Fabrication of $Yb2O3$—$SiO2$ core fiber by a new process", Proceedings ECOC 1985, pp. 15-18 (IOOC—ECOC '85, Venice).
L.M. Yang et al.; "Chirped pulse amplification of ultrashort pulses using neodymium and erbium doped fiber amplifiers," Springer Series in Chemical Physics, Ultrafast Phenomena, IX, printed 1994. pp. 187-189.
H. Zellmer et al.; "Double-Clad Fiber Laser with 30W Output Power," OSA TOPS vol. 16, Optical Amplifiers and Their Applications, 1997, pp. 137-140.paper: FAW18.
H. Zellmer et al.; High-power cw neodymium-doped fiber laser operating at 9.2 W with high beam quality, Optics Letters, vol. 20, No. 6, Mar. 15, 1995, pp. 578-580.
J.E. Townsend, "The development of optical fibres doped with rare-earth ions," PhD Thesis, University of Southampton, Apr. 1990, pp. 249-252.
R.P. Tumminelli et al., File History of U.S. Appl. No. 07/648,726, issued as U.S. Pat. No. 5,121,460, Sep. 8, 1992.
Non-final Office Action in Ex Parte Reexamination 90/008,971 dated Mar. 30, 2009.
Amendment in Ex Parte Reexamination 90/008,971 under 37 C.F.R. 1.111 dated Jun. 1, 2009, with Appendix, Declaration of Dr. Wayne H. Knox, and declaration of Dr. Peter. C. Schultz.

Defendant IPG Photonics Corporation's Motion to Stay the Litigation Pending Reexamination, Dec. 21, 2007.
Exhibit 1 to Defendant IPG Photonics Corporation's Motion to Stay the Litigation Pending Reexamination—Defendant IPG Photonics Corporation's First Set of Interrogatories (Nos. 1-13), Dec. 21, 2007.
Exhibit 2 to Defendant IPG Photonics Corporation's Motion to Stay the Litigation Pending Reexamination—Plaintiff IMRA America, Inc.'s Responses to Defendant IPG Photonics Corporation's First Set of Interrogatories (Nos. 1-13), Dec. 21, 2007.
Exhibit 3 to Defendant IPG Photonics Corporation's Motion to Stay the Litigation Pending Reexamination—Plaintiff's First Supplemental Responses to Defendant's Interrogatory Nos. 2, 5, and 6, Dec. 21, 2007.
Exhibit 5 to Defendant IPG Photonics Corporation's Motion to Stay the Litigation Pending Reexamination—Request for Ex Parte Reexamination Transmittal Form, Request for Ex Parte Reexamination of U.S. Pat. No. 5,818,630 Detailed Submission, Dec. 21, 2007.
Defendant IPG Photonics Corporation's Response to Decision Sua Sponte Vacating Ex Parte Reexamination Filing Date and Replacement Request for Ex Parte Reexamination of U.S. Pat. No. 5,818,630, Mar. 12, 2008.
Defendant IPG Photonics Corporation's Response to Notice of Failure to Comply with Ex Parte Reexamination Request Filing Requirements and Corrected Request for Ex Parte Reexamination of U.S. Pat. No. 5,818,630, Jan. 22, 2008.
Defendant IPG Photonics Corporation's Request for Ex Parte Reexamination of U.S. Pat. No. 5,818,630, Dec. 21, 2007.
Plaintiff IMRA America, Inc.'s Opposition to Defendant's Motion to Stay the Litigation Pending Reexamination, Jan. 4, 2008.
Exhibit A to Plaintiff Imra America, Inc.'s Opposition to Defendant's Motion to Stay the Litigation Pending Reexamination—Nov. 21, 2006 LoPresti Letter to Harter (redacted), Jan. 4, 2008.
Exhibit B to Plaintiff IMRA America, Inc.'s Opposition to Defendant's Motion to Stay the Litigation Pending Reexamination—Defendant IPG Photonics Corporation's Responses to Plaintiff IMRA America, Inc.'s First Set of Interrogatories (Nos. 1-12), Jan. 4, 2008.
Exhibit E to Plaintiff IMRA America, Inc.'s Opposition to Defendant's Motion to Stay the Litigation Pending Reexamination—Defendant IPG Photonics Corporation's Supplemental Interrogatory Response to Interrogatory No. 2, Jan. 4, 2008.
Exhibit E to Plaintiff's Brief in Support of its Motion to Compel Production of Documents and an In-Person Inspection of Defendant's Electronically Stored Documents—Defendant's Responses to Plaintiff's Second Set of Requests for Production of Documents and Things (Nos. 99-182), Feb. 15, 2008.
Complaint for Patent Infringement and Exhibit A (U.S. Pat. No. 5,818,630 & Civil Cover Sheet), Nov. 16, 2006.
Stipulated Protective Order and Exhibit A (Confidentiality Agreement), Jun. 20, 2007.
Signed Stipulated Protective Order and Exhibit A (Confidentiality Agreement), Jul. 2, 2007.
IMRA's First Amended Complaint for Patent Infringement and U.S. Pat. No. 5,818,630, Dec. 22, 2006.
Defendant IPG Photonics Corporation's Answer, Affirmative Defenses, Counterclaims and Jury Demand, Jan. 9, 2007.
Plaintiff IMRA America, Inc.'s Answer to Counterclaims of Defendant IPG Photonics Corporation, Feb. 1, 2007.
Plaintiff's First Set of Interrogatories to Defendant (Nos. 1-12), Feb. 28, 2007.
Plaintiff's First Set of Requests for Production of Documents and Things to Defendant (Nos. 1-98), Feb. 28, 2007.
Defendant IPG Photonics Corporation's First Set of Interrogatories (Nos. 1-13), Mar. 19, 2007.
Defendant IPG Photonics Corporation's First Set of Requests for Production of Documents and Things (Nos. 1-84), Mar. 19, 2007.
Defendant IPG Photonics Corporation's Responses to Plaintiff IMRA America, Inc.'s First Set of Interrogatories (Nos. 1-12), Mar. 30, 2007.
Defendant's Responses to Plaintiff's First Set of Requests for Production of Documents and Things (Nos. 1-98), Mar. 30, 2007.
Plaintiff IMRA America, Inc.'s Responses to Defendant IPG Photonics Corporation's First Set of Interrogatories (Nos. 1-13), Apr. 18, 2007.

(56) References Cited

OTHER PUBLICATIONS

Plaintiff IMRA America, Inc.'s Responses to Defendant IPG Photonics Corporation's First Set of Requests for Production of Documents and Things (Nos. 1-84), Apr. 18, 2007.
IPG's Subpoena to Lih-Mei Yang, Sep. 27, 2007.
Defendant's Responses to Plaintiff's Second Set of Requests for Production of Documents and Things (Nos. 99-182), Oct. 22, 2007.
Defendant IPG Photonics Corporation's Supplemental Interrogatory Response to Interrogatory No. 2, Nov. 16, 2007.
Plaintiff's First Supplemental Responses to Defendant's Interrogatory Nos. 2, 5 and 6, Nov. 21, 2007.
Plaintiff's Second Supplemental Response to Defendant's Interrogatory No. 5, Dec. 13, 2007.
IPG's Subpoena to Almantas Galvanauskas, Dec. 14, 2007.
Defendants IPG Photonics Corporation's Second Set of Requests for Production of Documents and Things (Nos. 85-88), Dec. 19, 2007.
Expert Report of Martin J Adelman with Exhibits A-C, Dec. 21, 2007.
IPG's Notice of Deposition and Subpoena to Richard Turner, Dec. 27, 2007.
IPG's Subpoena to Sughrue Mion, PLLC, Dec. 27, 2007.
Defendant IPG Photonics Corporation's Supplemental Interrogatory Responses to Interrogatory Nos. 2, 4, 5, 7 and 9, Dec. 27, 2007.
Plaintiff's 30(b)(6) Notice of Deposition of IPG Photonics Corporation Regarding Liability with Exhibit A, Dec. 28, 2007.
Defendant IPG Photonics Corporation's Second Set of Interrogatories (Nos. 14-20), Jan. 14, 2008.
Defendant IPG Photonics Corporation's Third Set of Requests for Production of Documents and Things (No. 89), Jan. 14, 2008.
Plaintiff IMRA America, Inc.'s Second Set of Interrogatories to Defendant IPG Photonics Corporation (Nos. 13-18), Jan. 16, 2008.
Plaintiff IMRA America, Inc.'s Third Set of Requests for Production of Documents and Things to Defendant IPG Photonics Corporation (Nos. 183-241), Jan. 16, 2008.
Plaintiff's Response to Defendant's Second Set of Requests for Production of Documents and Things (Nos. 85-88), Jan. 18, 2008.
IPG's Subpoena to MIT, Jan. 18, 2008.
Rebuttal Expert Report of Hon. Lawrence J. Goffney, Jr. with Appendices A & B, Jan. 27, 2008.
Defendant IPG Photonics Corporation's Responses to Plaintiff IMRA America, Inc.'s Second Set of Interrogatories (Nos. 13-18), Feb. 15, 2008.
Defendant IPG Photonics Corporation's Responses to Plaintiff's Third Set of Requests for Production of Documents and Things (Nos. 183-240), Feb. 15, 2008.
Lih-Meh Yang Deposition Transcript (condensed) (some deposition exhibits listed separately below), Feb. 14, 2008.
Peter Kaiser and Donald Keck, excerpt from Optical Fiber Communications II, Academic Press, 1988 (YANG000004-YANG000006, exhibit 6).
Zenteno, et al., Frequency-modulated cavity-dumped Nd-doped fiber laser, Optics Letters, vol. 16, No. 5, Mar. 1, 1991, pp. 315-317. (YANG000017-YANG000019, exhibit 8).
Yang. L.-M.,et al., Upconversion Multimode Fiber Amplifier, Ultrafast Pulse, vol. II, No. 2, Spring, 1995, pp. 1-2. (YANG000021-YANG000022, $1^{st}$ part of exhibit 9), Spring 1995.
Yang, L.-M.,et al., Upconversion chirped pulse amplification of ultrashort pulses using a multimode Tm:ZBLAN fiber, SPIE, vol. 2377, pp. 148-156. (YANG000024-YANG000032, $2^{nd}$ part of exhibit 9), Feb. 1995.
Yang, L.-M., et al., Upconversion chirped pulse amplification in a multimode TM:ZBLAN fiber and temporally resolved modal analysis, CLEO'95, Monday morning, (YANG000033-YANG000034, $3^{rd}$ part of exhibit 9), 1995.
Yang, L, Generation and Amplification of Ultrashort Pulses in Erbium, Neodymium, and Thulium Fibers, dissertation, University of Michigan, 1996. (YANG000036-YANG000184, exhibit 2).
Stock, et al., Synchronous mode locking using pump-induced phase modulation, Optics Letters, vol. 18, No. 18, Sep. 15, 1993, pp. 1529-1530. (YANG000186-YANG000188, exhibit 13).

Fermann, et al., Environmentally stable Kerr-type mode-locked erbium fiber laser producing 360-fs pulses, Optics Letters, vol. 19, No. 1, Jan. 1, 1994, pp. 43-45. (YANG000190-YANG000192, exhibit 11).
Yang, et al., Chirped-Pulse Amplification of Ultrashort Pulses Using Neodymium- and Erbium-Doped Fiber Amplifiers, Springer Series in Chemical Physics, vol. 60, 1994, pp. 187-189. (YANG000194-YANG000196, exhibit 12).
Declaration of Emily Florio in support of ex parte request for reexamination of U.S. Pat. No. 5,818,630, Mar. 12, 2008.
Reflective-mode conversion with UV-Induced phase gratings in two-mode fiber, Thomas A. Strasser, OFC Technical Digest, 1997.
158-µJ pulses from a single-transverse-mode, large-mode-area erbium-doped fibers amplifier, D. Taverner; D. J. Richardson; L. Dong; J. E. Caplen, Optics Letters, vol. 22, No. 6, p. 378-380, Mar. 15, 1997.
Chirped-pulse amplification of ultrashort pulses with a multimode TM:ZBLAN fiber upconversion amplifier, L.-M. Yang; T. Sosnowki; M. L. Stock; T. B. Norris; J. Squier; G. Mourou, Optics Letters, vol. 20, No. 9, p. 1044-1046, May 1, 1995.
Pulse Dispersion for single-mode operation of multimode cladded optical fibres, W. A. Gambling; D. N. Payne; H. Matsumura, Electronics Letters, vol. 10, Mar. 1974.
Optical Power Flow in Multimode Fibers, D. Gloge, Bell Technical Journal, vol. 51 No. 3 p. 1767-1783, Oct. 1972.
Single-mode resonator incorporating an internal multimode optical fiber and a phase-conjugate reflector, B. Luther-Davies; A. Liebman; A. Maddever, Josa B, vol. 7 No. 7 p. 1216-1220, Jul. 1990.
Theory of Dielectric Optical Waveguides, D. Marcuse, Academic Press, pp. 238-239, 1974.
Generation of high-energy 10-fs pulses by a new pulse compression technique, M. Nisoli; S. De Silvestri, O. Svelto, CLEO '96 Technical Digest, pp. 189-190, Jun. 1996.
Office Action and Japanese Application No. 1998-175755,. "Single-Mode Amplifier and Compressors Based on Multi-mode Fibers," IMRA America Application Ref. No. IM-59JP, 1998, and Cladding-pumped fiber laser/amplifier system generation 100 uj energy picosecond pulses, J. D. Minelly; A. Galvanauskas; D. Harter; J. E. Caplen; L. Dong, CLEO '97, p. 475-476, May 23, 1997.
Amplification in a fiber laser, C. J. Koester; E. Snitzer, Applied Optics, vol. 3, No. 10, p. 1182-1186, Oct. 1964.
An overview of fiber-optic gyroscopes, R. A. Bergh; H. C. Lefevre; H. J. Shaw, Journal of Lightwave Technology, vol. LT-2, No. 2, p. 91-107, Apr. 1984.
Low threshold miniature Q-switched Nd:MgO:LINbO3 laser, A. Cordova-Plaza; M. J. F. Digonnet; H. J. Shaw, Optical Society of America, Annual Meeting Digest of Technical Papers, FD6, Oct. 1986.
Simple side coupler for coupling between laser diode and single-mode optical fiber, K. S. Lee; F. S. Barnes, Applied Optics, vol. 26, No. 12, p. 2294-2296, Jun. 15, 1987.
Partially coherent light generated by using single and multimode optical fibers in a high-power Nd: glass laser system, H. Nakano; N. Miyanaga; K. Yagi; K. Tsubakimoto; T. Kanabe; M. Nakatsuka; S. Nakai, Applied Physics Letters, vol. 63, No. 5, p. 580-582, Aug. 2, 1993.
Clad Nd-Yag Fibers for Laser Applications, Digonnet, M.J.F.; Gaeta, C.J.; Omeara, D; Shaw, H.I., Journal of Lightwave Technology, vol. LT-5, pp. 642-646, May 1987.
Passive and Active Fiber Optic Components, M. J. F. Digonnet, Ph.D. Dissertion, Stanford University, Sep. 1983.
Mode-locking of a neodymium-doped monomode fibre laser, I. P. Alcock; A. J. Ferguson; D. C. Hanna; A. C. Tropper, Electronics Letters, vol. 22, No. 5, p. 266-268, Feb. 27, 1986.
Efficient diode-pumped CW and Q-switched single-mode fibre laser, M. Jauncey; J. T. Lin; L. Reekif; R. J. Mears, Electronics Letters, vol. 22, No. 4, p. 198-199, Feb. 13, 1986.
Power coupling from laser diodes into single-mode fibres with quadrangular pyramid-shaped hemiellipsoidal ends, H. Sakaguchi; N. Seki; S. Yamamoto, Electronics Letters, vol. 17, No. 12, p. 425-426, Jun. 11, 1981.

(56) References Cited

OTHER PUBLICATIONS

Evanescent amplification in a single-mode optical fibre, W. V. Sorin; K. P. Jackson; H. J. Shaw, Electronics Letters, vol. 19, No. 20, p. 820-822, Sep. 1983.
High-power single-mode fiber amplifiers using multi-mode fibers, M. E. Fermann; A. Galvanauskas; D. Harter; J. D. Minelly, OFC '98 Technical Digest, 1998.
Self-contained LED-Pumped single-crystal Nd: YAG fiber laser, J. Stone; C. A. Burrus, Fiber and Integrated Optics, vol. 2, No. 1, p. 19-46, 1979.
Fibre lasers and dispersion in fibres, E. Snitzer, Proc. First European Electro-Optics Markets and Technical Conf., p. 374-378, Sep. 1972.
Mode conversion coefficients in optical fibers, W, A. Gambling; D. N. Payne; H. Matsumura, Applied Optics vol. 14 No. 7 p. 1538-1542, Jul. 1975.
Alexandrite-laser-pumped Cr 3+: LiSrA1F6, D. J. Harter, et al., Optics Letters, vol. 17, No. 21, p. 1512-1514, Nov. 1992.
High-power extended-cavity laser at 1.3 um with a single-mode fiber output port, G. Eisenstein; U. Koren; R. S. Tucker; G. Raybon; A. G. Dentai; L. W. Stulz; B. I. Miller, Applied Physics Letters, vol. 50, p. 22., Jun. 1987.
Lens coupling of laser diodes to single-mode fibers, M. Sumida; K. Takemoto, Journal of Lightwave Technology, vol. LT-2, No. 3, p. 305-311, Jun. 1984.
Low-threshold synchronously pumped all-fiber ring Raman laser, E. Desurvire; A. Imamoglu; H. J. Shaw, Journal of Lightwave Technology, vol. LT-5, No. 1, p. 89-96, Jan. 1987.
Yb 3+-ring-doped fiber for high-energy pulse amplification, J. Nilsson; R. Paschotta; J. E. Caplen; D. C. Hanna, Optics Letters, vol. 22, No. 14, p. 1092-1094, Jul. 15, 1997.
An Erbium-doped Multimode optical fiber amplifier, G. Nykolak; S. A. Kramer; J. R. Simpson, D. J. DiGiovanni; C. R. Giles; H. M. Presby, Photonics Technology Letters, vol. 3, No. 12, p. 1079-1081, Dec. 1991.
High energy single-transverse-mode Q-switched fiber laser based on a multimode large-mode-area erbium-doped fiber, H. L. Offerhaus; N. G. Broderick; D. J. Richardson, Optics Letters, vol. 23, No. 21, p. 1683-1685, Nov. 1998.
Continuous-wave oscillation of a monomode neodymium-doped fibre laser at 0.9 um on the 4 F 3/2-4 I 9/2 transition, I. P. Alcock; A. I. Ferguson; D. C. Hanna; a.C. Tropper, Optics Communications, vol. 58, No. 6, p. 405-408, Jul. 1996.
All-single-mode fiber resonator, L. F. Stokes; M. Chodorow; J. J. Shaw, Optics Letters, vol. 7, No. 6, p. 288-290, Jun. 1982.
All-single-mode fiber-optic gyroscope with long-term stability, R. A. Bergh; H. C. Lefevre; H. J. Shaw, Optics Letters, vol. 6, No. 10, p. 502-504, Oct. 1981.
New developments in laser resonators, A. E. Siegman, Photonics West, SPIE Optical Resonators, vol. 1224, p. 2-14, 1990.
Optimization of Filtering in soliton fiber lasers, K. Tamura; E. P. Ippen, IEEE Photonics Technical Letters, vol. 6, No. 12, p. 1433-1435, Dec. 1994.
Generation of high-energy pulses using a large-mode-area erbium-doped fiber amplifier, D. Taverner; A. Galvanauskas; D. Harter; D. J. Richardson; L. Dong, CLEO '96, pp. 496-497, 1996.
Generation of 111kW (0.5mJ) Pulses at 1.5mm Using a Gated Cascade of Three Fibre Amplifiers, B. Desthieux, R.I. Laming & D. N. Payne, pp. 329-332, IPGI p. 012016-012019, 1993.
Cladding-Pumped Passively Mode-locked femtosecond fiber lasers, ME Fermann, D. Harter, J,D. Minelly, G.G. Vienne CLEO '96, pp. 493-494, 1996.
Low-Loss Joints between Dissimilar Fibres by Tapering fusion splices, D. Mortimore, J. Wright, Electronics Letters 13, Mar. 1986 vol. 22, No. 6 p. 318.
Measurement of Intermodal coupling in weakly multimode fibre optics, S. Shaklan, Electronics Letters vol. 26, No. 24, pp. 2022-2023, Nov. 22, 1990.
Mode Excitation in a multimode optical-fibre waveguide, Gambling, et al., Electronics Letters, Sep. 6, 1973, vol. 9, No. 16, p. 412-414.

Neodymium-doped silica single-mode fibre lasers, Mears, Reekie, Poole, Payne, Electronics Letters vol. 21, No. 17, p. 738-740, Aug. 15, 1985.
Glass Lasers, E. Snitzer, Applied Optics, vol. 5, No. 10, Oct. 1966, p. 1487-1489.
Highly selective evanescent modal filter for two-mode optical fibers, W.V. Sorin, B. Y. Kim, and H.J. Shaw, Optics Letters, vol. 11, No. 9, p. 581-583, Sep. 1986.
Generation and amplification of ultrashort pulses in erbium-doped optical fibers, M.L. Stock, Ph. D. Dissertation, University of Michigan, 1994.
Chirped pulse amplification in an erbium-doped fiber oscillator/erbium-doped fiber amplifier system, M. Stock, G. Mourou, Optics Communications, vol. 106, p. 249-252, 1994.
Generation of high-power femtosecond optical pulses by chirped pulse amplification in erbium doped fibers, M.L. Stock, A. Galvanauskas, M.E. Fermann, G. Mourou and D. Harter, Nonlinear Guided-Wave Phenomena, vol. 15, Optics Society of America 1993 Technical Digest Series, Sep. 1993.
Tapered-Beam Expander for Single-Mode Optical-Fiber Gap Devices, Jedrzejewski, K.P., et al., Electronics Letters, vol. 22, No. 2, p. 105-106, Jan. 16, 1986.
Chirped-pulse amplification of ultrashort pulses using Neodymium- and Erbium-doped fiber amplifiers, L. -M. Yang; M. L. Stock; G. Mourou; A. Galvanauskas, M. E. Fermann; D. J. Harter, Proc. of 9th International Conference on Ultrafast Phenomena IX, 1994, p. 187-189.
A mode-filtering scheme for Improvement of the Bandwidth-Distance Product in Multimode fiber systems, Z. Haas, Journal of Lightwave Technology, vol. 11, No. 7, Jul. 1993, p. 1125-1131.
IRE-POLUS marketing literature No. 1, IPGI 12293-12301, 1996.
IRE-POLUS marketing literature No. 2, IPGI 12302-12318, 1996.
IRE-POLUS marketing literature No. 3, IPGI 12319-12335, 1996.
IRE-POLUS marketing literature No. 4, IPGI 12336-12413, 1996.
M2 concept characterizes beam quality, T. F. Johnston, Jr., Laser Focus World, May 1990, p. 173-183.
Single transverse mode operation at 1345 nm wavelength of a diode-laser pumped neodymium:ZBLAN multimode fiber laser; Millar, C.A.; Fleming, S.C.; Brierley, M.C.; Hunt, M.H, IEEE Photonics Technical Letters, vol. 2, No. 6, p. 415-417, Jun. 1990.
V-groove side-pumped 1.5-μm fiber amplifier, L. Goldberg, D.J. Ripin, E. Snitzer, B. Cole, CLEO '96, 1996, p. 208-209.
Saturable absorber modelocked polarisation maintaining erbium-doped fibre laser, E.A. DeSouza, C.E. Soccolich, W. Pleibel, R.H. Stolen, J.R. Simpson, D.J. DiGiovanni, Electronics Letters, vol. 29, No. 5, Mar. 4, 1993, p. 447-449.
Fiber-laser-based femtosecond parametric generator in bulk periodically poled LiNbO3, A. Galvanauskas, M.A. Arbore, M.M Fejer, M.E. Fermann, D. Harter, Optics Letters, vol. 22, No. 2, Jan. 15, 1997, p. 105-107.
All-fiber femtosecond pulse amplification circuit using chirped Bragg gratings, A. Galvanauskas, M. E. Fermann, D. Harter, K. Sugden, I. Bennion, Applied Physics Letters, vol. 66, No. 9, Feb. 1995, p. 1053-1055.
Source of instability in fibre soliton lasers, S.M.J. Kelly, D.U. Noske, N. Pandit, J.R. Taylor, 1992, IPGI 8244-8247.
Mode division multiplexing in optical fibers, S. Berdagué, P. Facq, Applied Optics, vol. 21, No. 11, Jun. 1, 1982, p. 1950-1955.
Design Optimization for Efficient Erbium-Doped Fiber Amplifiers, E. Desurvire, et al., Journal of Lightwave Technology, vol. 8, No. 11, pp. 1730-1741, 1990.
Valentin P. Gapontsev et al; "3W Saturation Power Polarisation Maintaining 1060nm Ytterbium Fiber Amplifier", SPIE, vol. 3815, Nov. 2, 2006, pp. 264-268.
"Advanced and Proven Technology", IRE-Polus Group, No. 5455, 1996, pp. 1-5.
"Pulsed Ytterbium Fiber Laser", Model YLPM-3000, IRE-Polus Group, No. 5455, 1996, pp. 1-2.
"Pulsed Single Mode Ytterbium Fiber Laser", YLP-Series, IRE-Polus Group, No. 5455, 1996, pp. 1-2.
"High Power Single-Mode CW Ytterbium Fiber Laser Module", Model PYL-8000M-1047, IRE-Polus Group, No. 5455, 1996, pp. 1-2.

(56) References Cited

OTHER PUBLICATIONS

"High Power Single-Mode CW Ytterbium Fiber Laser Module", Model PYL-5000M, IRE-Polus Group, No. 5455, 1996, pp. 1-2.
"Single-Mode Ytterbium Fiber Laser", Model YLD-2000-1030, IRE-Polus Group, No. 5455, 1996, pp. 1-2.
"Single-Mode Ytterbium Fiber Laser Module", Model YLM-1000A-1030 (1047), IRE-Polus Group, No. 5455, 1996, pp. 1-2.
"Single-Mode High Power Ytterbium Fiber Lasers", PYL-Series, IRE-Polus Group, No. 5455, 1996, pp. 1-2.
"Single-Mode Ytterbium Fiber Laser", Model YL-Series, IRE-Polus Group, No. 5455, 1996, pp. 1-3.
"Tunable ErbiumFiber Laser", Model ELT-100, IRE-Polus Group, No. 5455, 1996, pp. 1-2.
"Single-Frequency Erbium Fiber Laser", Model ELD-500BC, IRE-Polus Group, No. 5455, 1996, pp. 1-2.
"Single-Mode CW Erbium Fiber Laser", Model ELD-5000, IRE-Polus Group, No. 5455, 1996, pp. 1-2.
"Single-Mode Eribum Fiber Laser", EL-Series, IRE-Polus Group, No. 5455, 1996, pp. 1-3.
"Eye-Safe Pulsed Erbium Fiber Laser", (Bench-Top Version) Model ELPD-1000R, IRE-Polus Group, No. 5455, 1996, pp. 1-2.
"Eye-Safe Pulsed Erbium Fiber Laser Module", Model ELPM-500R, IRE-Polus Group, No. 5455, 1996, pp. 1-2.
"Diode-Pumped Pulsed Erbium Fiber Laser", Model ELPD-100M "Eye-Safe", IRE-Polus Group, No. 5455, 1996, pp. 1-2.
"Pulsed Erbium Fiber Laser", Model ELPD-100LF, IRE-Polus Group, No. 5455, 1996, pp. 1-2.
"Eye-Safe Pulsed Erbium Fiber Laser", Model ELPD-10000, IRE-Polus Group, No. 5455, 1996, pp. 1-2.
"Pulsed Erbium Fiber Laser", Model ELPD-200HF, IRE-Polus Group, No. 5455, 1996, pp. 1-2.
Poole, C.D., et al., "Optical Fiber-Based Dispersion Compensation Using Higher Order Modes Near Cutoff," J. Lightwave Technology, vol. 12, No. 10, Oct. 1994, pp. 1746-1758.
Walton, D.T., et al.,"Broad-bandwidth pulse amplification to the 10-µJ level in an ytterbium-doped germanosilicate fiber," Optics Letters, vol. 21, No. 14, Jul. 15, 1996, pp. 1061-1063.
Hanna, D.C., et al., "A 1-Watt thulium-doped cw fibre laser operating at 2µm," Optics Comm., vol. 80, No. 1, Dec. 1, 1990, pp. 52-56.
Chernikov, S.V., et al., "1.08-2.2-µm supercontinuum generation from Yb3+-doped fiber laser," in Conference on Lasers and Electro-Optics, J. Bowers, et al., eds., vol. 9 of OSA Technical Digest (Optical Society of America, 1996), CLEO 96, paper CTuU4, Jun. 1996.
Amendment and Response to Office Action dated Feb. 26, 2015, in U.S. Appl. No. 14/223,287, filed Mar. 24, 2014, in 10 pages.
Brief of Correction in Japanese Invalidation Case No. 2010-800095, Invalidity Trial for JP Pat. No. 3990034, filed by Demandant of Correction IMRA America, Inc., dated Jun. 6, 2013, in 25 pages.
English Translation of Rebuttal in Japanese Invalidation Case No. 2010-800095, Invalidity Trial for JP Pat. No. 3990034, filed by Demandant IPG Photonics Corp., dated Sep. 2, 2013, in 36 pages.
Brief in Japanese Invalidation Case No. 2010-800095, Invalidity Trial for JP 3990034, filed by Demandee IMRA America, Inc., dated Dec. 2, 2013, in 51 pages.
Brief of Correction in Japanese Invalidation Case No. 2010-800095, Invalidity Trial for JP 3990034, filed by Demandant of Correction IMRA America, Inc., dated Dec. 2, 2013, in 23 pages.
Exhibit A31: U.S. Pat. No. 3,808,549 issued Apr. 30, 1974 and Japanese translation of highlighted portions, in 7 pages.
Exhibit A32: U.S. Pat. No. 4,829,529 issued May 9, 1989 and Japanese translation of highlighted portion, in 6 pages.
Exhibit A33: U.S. Pat. No. 5,473,622 issued Dec. 5, 1995 and publication of corresponding Japanese Patent Laid-Open No. 8-236841, with highlight, in 14 pages.
Exhibit A34: International Publication No. WO 95/10868 published Apr. 20, 1995 and Japanese translation of highlighted portion, in 16 pages.
Exhibit A35: U.S. Pat. No. 5,627,848 issued May 6, 1997 and publication of corresponding Japanese Patent Laid-Open No. 9-167869, in 26 pages.

Exhibit A36: Summary of paper CFD4 presented at Conf. on Lasers and Electro-Optics, CLEO'97, Optical Society of America held in May 1997 entitled "Cladding-pumped fiber laser/amplifier system generating 100 µJ energy picosecond pulse" by J. D. Minelly et al. And Japanese translation of highlighted portions, in 7 pages.
Koechner, Walter, "Solid-State Laser Engineering", Fourth Extensively Revised and Updated Edition, Springer Series in Optical Sciences, Springer-Verlag, Berlin, 1996, pp. 352-353.
D. Marcuse, "Derivation of Coupled Power Equations", The Bell System Technical Journal, vol. 51, No. 1, Jan. 1972, pp. 229-237.
Opposition filed by IPG Laser GmbH against German Patent No. DE 19828154 B4, dated Aug. 2, 2013, in 55 pages.
Notification from German Patent Office regarding German Patent No. DE 19828154 B4, dated Nov. 7, 2013, in 5 pages.
Opposition filed by JENOPTIK Laser GmbH against German Patent No. DE 19828154 B4, dated Aug. 6, 2013, in 24 pages.
Reply by IMRA America, Inc. to Opposition dated Jul. 2, 2013 regarding German Patent No. DE 19828154, dated Feb. 11, 2014, in 66 pages (exhibits listed separately below).
Exhibit B1: Claim 1 of the patent-in-suit in 2 pages, Feb. 11, 2014.
Exhibit B2: Feature analysis of claim 1 of the patent-in-suit in 7 pages, Feb. 11, 2014.
Exhibit B3: Declaration of Dr. Wayne Harvey Knox, in 31 pages, Feb. 11, 2014.
English translation of Second Rebuttal in Invalidation Case No. 2010-800095 for JP Pat. No. 3990034, filed by Demandant IPG Photonics Corporation, dated Mar. 31, 2014, in 27 pages.
Second Brief in Invalidation Case No. 2010-800095 for JP Pat. No. 3990034, filed by Demandee IMRA America, Inc., dated Jun. 4, 2014, in 48 pages.
Third Brief of Correction in Invalidation Case No. 2010-800095 for JP Pat. No. 3990034, filed by Demandant of Correction IMRA America, Inc., dated Jun. 4, 2014, in 42 pages.
Exhibit explanation in Invalidation Case No. 2010-800095 for JP Pat. No. 3990034, filed by Applicant IMRA America, Inc., dated Jun. 4, 2014, in 3 pages (Exhibits listed separately below).
Exhibit B-10, "High-Power Double-Clad Fiber Lasers," by Luis Zenteno, J. Lightwave Tech., vol. 11, No. 9, Sep. 1993, pp. 1435-1446, with markings.
Exhibit B-11, "Double-clad Fibers," RP Photonics Encyclopedia, available at http://www.rp-photonics.com/double_clad_fibers.htm, in 5 pages, with markings, Jun. 4, 2014.
Record of Oral Hearing before the Patent Trial and Appeal Board, Ex parte Martin E. Fermann, Appeal 2010-005849, U.S. Appl. No. 09/785,944, filed Feb. 16, 2001, dated Apr. 7, 2014, in 14 pages.
Decision on Appeal by the Patent Trial and Appeal Board, Ex parte Martin E. Fermann, Appeal 2010-005849, U.S. Appl. No. 09/785,944, filed Feb. 16, 2001, dated Mar. 31, 2014, in 9 pages.
Notice of Reason for Refusal, in JP Pat. Appl. No. 2012-274588, transmittal date Dec. 19, 2013, in 12 pages.
English Translation of paragraphs [0018] and [0019] of JP H07-253559, filed Oct. 3, 1995, in 1 page.
Applicant's Reply to Notice of Reason for Refusal, in JP Pat. Appl. No. 2012-274588, transmittal date Jun. 19, 2014, in 27 pages.
Po, H., et al., "High Power Neodymium-Doped Single Transverse Mode Fibre Laser," Electronics Letters, vol. 29, No. 17, Aug. 19, 1993, pp. 1500-1501.
Translation of Appeal by IPG Laser GmbH against Decision of the Patent Division 1.54 in the opposition matter DE 198 61 4982 B4 (owned by IMRA America, Inc.), dated May 6, 2013, in 29 pages.
Reply to the Brief of the Patentee dated Feb. 11, 2014, for opposition matter DE 198 28 154.4, filed by IPG Laser GmbH, dated Jun. 30, 2014, in 32 pages.
Exhibit E5a, Declaration of Mariellen F. Calter, Jun. 30, 2014.
Exhibit E6a, Declaration of Susan Wooding, Jun. 4, 2014.
Exhibit E6c, Appendix B to the declaration of Susan Wooding, Jun. 4, 2014.
Exhibit E13, D. J. Stolarski et al., "Operating Manual for Ultrashort Pulse Laser System-II (160 nm Operation)", date of the report: Dec. 1997.
Exhibit E14, Coherent, Mira 900, Modelocked Ti:Sapphire Lasers, 2002.

(56) References Cited

OTHER PUBLICATIONS

Exhibit E15, Newport, data sheet, "Microscope Objective Lenses", published in 2014.
Exhibit E16, M. Saruwatari et al., "Semiconductor laser to single-mode fiber coupler", Applied Optics, vol. 18, No. 11, pp. 1847 to 1856, Jun. 1, 1979.
Paper filed by Patentee IMRA America, Inc. In Opposition against DE 198 28 154.4, submitting auxiliary requests 1-4 (listed separately below), dated Jul. 1, 2014, in 54 pages.
Translation of Claim 1 according to first auxiliary request (as filed), dated Jul. 1, 2014.
Translation of Claim 1 according to 2nd auxiliary request (as filed), dated Jul. 1, 2014.
Corrected translation of Claim 1 according to 3rd auxiliary request (as filed), dated Jul. 11, 2014.
Translation of Claim 1 according to 4th auxiliary request (as filed), dated Jul. 1, 2014.
Translation of Restricted claim 1 after opposition (1st instance), dated Jul. 15, 2014.
Appeal Reasoning filed by patentee IMRA America, Inc., in Opposition against German Pat. No. DE 198 61 429 B4, dated Jul. 31, 2014, in 80 pages. (exhibits listed separately).
Claims 1-10 according to first auxiliary request filed by patentee IMRA America, Inc., in Opposition against German Pat. No. DE 198 61 429 B4, dated Jul. 31, 2014, in 4 pages.
Claims 1-9 according to second auxiliary request filed by patentee IMRA America, Inc., in Opposition against German Pat. No. DE 198 61 429 B4, dated Jul. 31, 2014, in 4 pages.
Gloge, D., "Optical Power Flow in Multimode Fibers," Bell Sys. Tech. J., vol. 51, No. 8, Oct. 1972 (Exhibit A1), in 17 pages.
Po, H., et al., "High Power Neodymium-Doped Single Transverse Mode Fibre Laser," Elec. Letters, vol. 29, No. 17, Aug. 19, 1993 (Exhibit A3), in 2 pages.
Neumann, E.G., "Single-Mode Fibers—Fundamentals," Springer Verlag , 1988, Chapter 5, pp. 61-75 (Exhibit A7).
Paper and claims filed in preparation for the oral hearing in the matter of German Patent Application No. DE 198 61 484.5, assigned to IMRA America, Inc., dated Sep. 30, 2014 in 32 pages.
Translation of claims granted in German Patent Application No. DE 198 61 484.5, assigned to IMRA America, Inc., dated Oct. 15, 2014, in 4 pages.
Third Rebuttal by Demandant IPG Photonics Corporation in Japanese Invalidation No. 2010-800095, Trial case for invalidation of Japanese patent No. 3990034, owned by patentee IMRA America, Inc., dated Aug. 5, 2014, in 46 pages.
Decision in the Oral Hearing of Jul. 15, 2014 in the Opposition procedure of opponents *IPG Laser GmbH and Jenoptik Laser GmbH* vs. *IMRA America, Inc.* with respect to German patent DE 198 28 154, dated Jul. 15, 2014, in 41 pages.
Translation of claims after Opposition in German patent DE 198 28 154, assigned to IMRA America, Inc., dated Oct. 31, 2014, in 2 pages.
U.S. Appl. No. 14/223,287, filed Mar. 24, 2014, in 60 pages.
Certification and Request for Prioritized Examination under 37 CFR 1.102(e) in U.S. Appl. No. 14/223,287, filed Mar. 24, 2014, in 2 pages.
Decision granting Request for Prioritized Examination, dated May 20, 2014, in U.S. Appl. No. 14/223,287, filed Mar. 24, 2014, in 1 page.
Restriction Requirement dated Sep. 17, 2014 in U.S. Appl. No. 14/223,287, filed Mar. 24, 2014, in 6 pages.
Response to Restriction Requirement dated Nov. 11, 2014, in U.S. Appl. No. 14/223,287, filed Mar. 24, 2014, in 5 pages.
Desurvire et al., "Design Optimization for Efficient . . . ," Journal of Lightwave Technology, Nov. 11, 1990, V8, pp. 1730-1741.
De Souza et al., "Saturable Absorber Modelocked . . . ," Electronics Letters, Mar. 4, 1993, V29, pp. 447-449.
Goldberg et al., "V-Groove Side-Pumped 1.5 micrometer fiber amplifier . . . ," CLEO 1996, paper CTuU1, Jun. 1996.
Federal Standard: FS-1037C. Telecommunications: Glossary of Telecommunication Terms, Aug. 1996.

Galvanauskas et al., "Fiber-Laser-Based Femtosecond . . . ," Optics Letter, Jan. 15, 1997, V22, pp. 105-107.
Galvanauskas et al., "All-fiber Femtosecond Pulse Amplification . . . ," Appl. Phys. Lett., Feb. 27, 1995, V66, pp. 1053-1055.
Bend losses of higher-order modes in dispersion-flattened multiple-clad optical fibres, H. Schwierz, E.G. Neumann, Fachbereich Elektrotechnik, Sep. 21, 1987.
Stimulated Raman scattering in a multimode optical fiber with bend-induced loss, A. Sharma, M. Dokhanian, Z.Q. Wu, R. Posey, A. Williams, P. Venkateswarlu, Optics Communications 111 (1994) 127-131.
Tuesday Afternoon, CLEO '98, CTu03 3:00pm, Frequency doubling of Er-doped multimode fiber compressor-amplifiers, Fermann, et al.
OFC '98 Technical Digest, Tuesday Afternoon, TuG8 3:45pm, "High power single mode fiber amplifiers using multimode fibers," Fermann, et al., pp. 39-40, Feb. 22-27, 1998.
Optics Letters, vol. 23, No. 1, Jan. 1, 1998, Single-mode excitation of multimode fibers with ultrashort pulses, Martin E. Fermann, pp. 52-54.
In relation to U.S. Appl. No. 09/317,221, filed May 24, 1999 are the following Office Actions and Responses (5 documents): a. Office Action dated Jan. 31, 2002 (5 pages), b. Response to Jan. 31, 2002 Office Action (8 pages), c. Office Action dated Sep. 27, 2002 (4 pages), d. Response to Sep. 27, 2002 Office Action (6 pages), e. Office Action dated Apr. 22, 2003 (5 pages).
In relation to U.S. Appl. No. 10/645,662, filed Aug. 22, 2003 are the following Office Actions and Responses (2 documents): a. Office Action dated Apr. 8, 2004 (5 pages), b. Response to Apr. 8, 2004 Office Action (9 pages).
L. M. Yang, et al., Upconversion chirped amplification of ultrashort pulses using a multimode Tm:ZBLAN fiber, SPIE vol. 2377, pp. 148-156, Feb. 1, 1995.
Feb. 15, 2001 Declaration filed in the '044 published application.
May 27, 2003 Preliminary Amendment filed in the '547 published application.
Jun. 10, 2003 Preliminary Amendment filed in the '547 published application.
Nov. 19, 2003 Office Action issued in the '547 published application.
Jan. 26, 2004 Response filed in the '547 published application.
Apr. 27, 2004 Notice of Allowability issued in the '547 published application.
May 20, 2004 Preliminary Amendment filed in the '547 published application.
Nov. 3, 2004 Office Action Issued in the '547 published application.
Jan. 21, 2005 Response filed in the '547 published application.
Rule 132 Declaration, filed Jan. 21, 2005, in the '547 published application.
May 17, 2005 Office Action issued in the '547 published application.
Jun. 30, 2005 Interview Summary in the '547 published application.
Aug. 22, 2005 Amendment flied in the '547 published application.
Dec. 20. 2005 Office Action issued in the '547 published application.
M. Fermann, Single-mode excitation of multimode fibers with ultrashort pulses. Optics Lett., vol. 23, No. 1, 52-54 (Jan. 1, 1998).
Jan. 12, 2006 Responses filed in the '547 published application.
Rule 132 Declaration, filed Jan. 12, 2008. In the '547 published application.
Jan. 30, 2006 Information Disclosure Statement filed in the '547 published application.
M. Fermann et al., Fiber-lasers for ultrafast op[tics, App. Phys. B, vol. 85, 259-275 (1997).
Opinion Rendered for SPI Lasers pic Regarding IMA's U.S. Pat. Nos. 5,818,630, 6,275,512 and 6,954,575 and IMRA's Pending Published Patent Applications '547, '044 and '458, Fulbright & Jaworski L.L.P. Mar. 2, 2006.
Lih-Mel Yang, Generation and Amplification of Ultrashort Pulses in the Eriblum Neodymium, and Thulium Fibers, Dissertation Abstracts International, Vl. 57, No. 6, Section B, p. 3823 (Dec. 1996)(the Yang dissertation).
B. Desthieux et al., 111 kW (0.5mJ) pulse amplicfication at 1.5 um using a Gated Cascade of Three Erbium-Doped Fiber Amplifiers, Appl. Phys. Lettt, vol. 63, No. 5, 586-88 (Aug. 2, 2993) (the Desthieux publication).
Notice of Allowability dated May 26, 1998 (the '630 patent).

(56) References Cited

OTHER PUBLICATIONS

Apr. 25, 2003 Declaration filed in the '547 published application.
Pandit, et al., Characteristic Instability of Fibre Loop Soliton Lasers, Electronics Letters, vol. 28, No. 5, Feb. 27, 1992.
Kelly, et al., Source of Instability in Fibre Soliton Lasers, Femtosecond Optics Group, Physics Dept., Imperial College, London.
Hofer, et al., Regenerative Nd: glass amplifier seeded with a Nd:fiber laser, Optics Letters, vol. 17, No. 11, pp. 807-809, Jun. 1, 1992.
Davey, et al., High-speed, mode-locked, tunable, integrated erbium fibre laser, Electronics Letters, vol. 28, No. 5, pp. 482-484, 1992.
Zimgible, 1-2 ps pulses from passively mode-locked laser diode pumped er-doped fibre ring laser, Electronics Letters, vol. 27, No. 19, pp. 1734-1735, Sep. 12, 1991.
Gapontsev, et al., 25 kW peak power, wide-tuneable-repetition-rate and pulse duration eye-safe MOPFA laser, Lasers and Electro-Optics, 1996, Jun. 2-7, 1996, CLEO '96.
Griebner, et al., Efficient laser operation with nearly diffraction-limited output from a diode-pumped heavily Nd-doped multimode fiber, Optics Letters, vol. 21, No. 4, Feb. 15, 1996.
Appeal of the Decision of the Patent Division 1.54 in the opposition matter DE 198 61 429 B4, filed by Appellant IPG Laser GmbH, dated Jan. 8, 2013, in 61 pages.
E.-G. Neumann, "Single-Mode Fibers—Fundamentals", Springer Verlag 1988, pp. 210-220, 281-319 (Exhibit E16).
A. Oehler et al., "New Field-Matching Techniques for Low-Loss Splices between Conventional and Dispersion-Flattened Single-Mode Fibres," 14th European Conference on Optical Communication, Electronics Division of the Institution of Electrical Engineers, Sep. 11-15, 1988, in 6 pages (Exhibit E17).
Stieb, W., et al., "Fusion Splices with Low Loss between SM-Fibers of Different Types", Preceedings of 37th International Wire and Cable Symposium, Reno, Nevada, Nov. 15-17, 1988, in 9 pages. (Exhibit E18).
Digonnet, M. J. F., "Passive and Active Fiber Optic Components," Ph.D. Dissertation, Stanford University, Sep. 1983, in 206 pages (Exhibit E19).
Order Reopening Case and Lifting Stay in *IMRA America, Inc.* v. *IPG Photonics Corporation*, Case No. 2:06-15139, E.D. Michigan, dated Oct. 13, 2009, in 1 page.
Defendant IPG Photonics Corporation's First Amended Answer, Affirmative Defenses, Counterclaims and Jury Demand, dated Oct. 16, 2009, in 41 pages.
Plaintiff IMRA America, Inc.'s Reply to First Amended Counterclaims of Defendant IPG Photonics Corporation, dated Nov. 6, 2009, in 7 pages.
Plaintiff IMRA America, Inc.'s List of Claim Terms to be Construed, dated Nov. 13, 2009, in 4 pages.
Joint Claim Construction Statement, dated Dec. 7, 2009, in 3 pages.
Exhibit A to Joint Claim Construction Statement, dated Dec. 7, 2009, in 7 pages.
Plaintiff IMRA America, Inc.'s Brief on Claim Construction, dated Dec. 8, 2009, in 25 pages.
Index of Exhibits—Plaintiff IMRA America, Inc.'s Brief on Claim Construction, dated Dec. 8, 2009, in 1 page.
Exhibit A—U.S. Pat. No. 5,818,630, dated Dec. 8, 2009, in 21 pages.
Exhibit B—Joint Claim Construction Statement, dated Dec. 8, 2009, in 14 pages.
Exhibit C—Knox Declaration, dated Dec. 8, 2009, in 44 pages.
Exhibit D—Excerpt from Expert Report of Philip H. Bucksbaum, Ph.D., dated Dec. 8, 2009, in 6 pages.
Defendant IPG Photonics Corporation's Opening Claim Construction Brief, dated Dec. 8, 2009, in 25 pages.
Index of Exhibits—Defendant IPG Photonics Corporation's Opening Claim Construction Brief, dated Dec. 8, 2009, in 1 page.
Exhibit 1—U.S. Pat. No. 5,818,630, dated Dec. 8, 2009, in 21 pages.
Exhibit 2—Expert Declaration of Philip H. Bucksbaum, Ph.D. in support of IPG Photonics Corporation's Opening Claim Construction Brief, dated Dec. 8, 2009, in 59 pages.
Exhibit 3—Excerpts of the Expert Report of Wayne H. Knox, Ph.D. on Infringement, dated Dec. 8, 2009, in 25 pages.
Exhibit 4—The original Patent Application from the File History of U.S. Pat. No. 5,818,630, dated Dec. 8, 2009, in 58 pages.
Exhibit 5—The Amendment in Ex Parte Reexamination Under 37 C.F.R. .sctn.1.111, dated Dec. 8, 2009, in 8 pages.
Exhibit 6—U.S. Pat. No. 7,190,511, dated Dec. 8, 2009, in 15 pages.
Exhibit 7—Excerpts of the Rebuttal Expert Report of Wayne H. Knox, Ph.D. on Invalidity, dated Dec. 8, 2009, in 3 pages.
Plaintiff IMRA America Inc.'s Rebuttal to Defendant IPG Photonics Corporation's Opening Claim Construction, dated Dec. 23, 2009, in 24 pages.
Index of Exhibits—Plaintiff IMRA America Inc.'s Rebuttal to Defendant IPG Photonics Corporation's Opening Claim Construction, dated Dec. 23, 2009, in 1 page.
Exhibit E—Ex Parte Reexamination Certificate, dated Dec. 23, 2009, in 10 pages.
Exhibit F—Second Declaration of Dr. Wayne H. Knox, dated Dec. 23, 2009, in 41 pages.
Defendant IPG Photonics Corporation's Responsive Claim Construction Brief, dated Dec. 23, 2009, in 26 pages.
Index of Exhibits—Defendant IPG Photonics Corporation's Responsive Claim Construction Brief, dated Dec. 23, 2009, in 1 page.
Exhibit 8—U.S. Pat. No. 5,818,630 Reexamination Certificate, dated Dec. 23, 2009, in 10 pages.
Exhibit 9—Amendment during Reexamination, dated Dec. 23, 2009, in 38 pages.
Exhibit 10—Excerpts from Rebuttal Expert Report of Wayne H. Knox, Ph.D. on Invalidity, dated Dec. 23, 2009, in 4 pages.
IPG Photonics Corporation Technology Tutorial by Dr. Philip Bucksbaum, Apr. 2010, in 37 pages.
IMRA America, Inc. Technology Tutorial by Dr. Wayne H. Knox, Apr. 2010, in 43 pages.
Transcript of Technical Tutorial Presentation before District Judge Anna Diggs Taylor, dated Apr. 13, 2010, in 62 pages.
IMRA Markman Presentation, dated Jun. 2, 2010, in 79 pages.
Presentation of IPG Photonics Corporation at Claim Construction Hearing, dated Jun. 2, 2010, in 108 pages.
Transcript of Markman hearing before District Judge Arthur J. Tarnow, dated Jun. 2, 2010, in 120 pages.
Declaration of Kurt L. Glitzenstein, filed Jun. 3, 2010, in 3 pages.
Index of Exhibits—Declaration of Kurt L. Glitzenstein, filed Jun. 3, 2010, in 1 page.
Exhibit 11—Excerpts from the Deposition of Martin Fermann taken on Mar. 9, 2010, filed Jun. 3, 2010, in 15 pages.
Exhibit 12—Excerpts from the Deposition of Richard C. Turner taken on May 4, 2010, filed Jun. 3, 2010, in 18 pages.
Exhibit 13—U.S. Pat. No. 5,422,897, issued Jun. 6, 1995, filed Jun. 3, 2010, in 9 pages.
Exhibit 14—Excerpts from the Final Expert Report of Wayne H. Knox on Infringement served on Feb. 10, 2010, filed Jun. 3, 2010, in 6 pages.
Exhibit 15—Notice of Allowability for U.S. Pat. No. 5,818,630 mailed May 26, 1998, filed Jun. 3, 2010, in 7 pages.
IPG Photonics Corporation's Supplemental Legal Memorandum Regarding New Argument Made at Hearing by IMRA America, Inc., dated Jun. 18, 2010, in 3 pages.
Plaintiff IMRA America, Inc.'s Response to Supplemental Legal Memorandum Regarding New Argument Made at Hearing, dated Jun. 23, 2010, in 5 pages.
Opinion and Order of District Judge Arthur J. Tarnow, dated Dec. 27, 2010, in 19 pages.
Examiner Interview Summary from Reexamination of U.S. Pat. No. 5,818,630, in Reexamination Control No. 90/008,971 filed Mar. 12, 2008, dated Jun. 24, 2009, in 2 pages.
Notice of Intent to Issue Ex Parte Reexamination Certificate for U.S. Pat. No. 5,818,630, in Reexamination Control No. 90/008,971 filed Mar. 12, 2008, dated Jun. 26, 2009, in 7 pages.
Examiner Interview Summary from Reexamination of U.S. Pat. No. 5,818,630, in Reexamination Control No. 90/008,971 filed Mar. 12, 2008, dated Jul. 2, 2009, in 1 page.

(56) References Cited

OTHER PUBLICATIONS

Notice of Intent to Issue Ex Parte Reexamination Certificate for U.S. Pat. No. 5,818,630, in Reexamination Control No. 90/008,971 filed Mar. 12, 2008, dated Jul. 21, 2009, in 6 pages.
Applicant Interview Summary from Reexamination of U.S. Pat. No. 5,818,630, in Reexamination Control No. 90/008,971 filed Mar. 12, 2008, dated Jul. 24, 2009, in 3 pages.
Ex Parte Reexamination Certificate for U.S. Pat. No. 5,818,630, dated Oct. 27, 2009, in 9 pages.
Request for Ex Parte Reexamination of U.S. Pat. No. 5,818,630, dated Aug. 19, 2009, in 117 pages.
Request for Ex Parte Reexamination Transmittal Form for U.S. Pat. No. 5,818,630, dated Aug. 19, 2009, in 2 pages.
Declaration under 37 C.F.R. .sctn. 1.132 by Dr. Philip H. Bucksbaum in Support of Request for Ex Parte Reexamination of U.S. Pat. No. 5,818,630, dated Aug. 19, 2009, in 56 pages.
Order denying request for Ex Parte Reexamination of U.S. Pat. No. 5,818,630, dated Nov. 13, 2009, in Reexamination Control No. 90/010,650 filed Aug. 19, 2009, in 16 pages.
Petition Under 37 C.F.R. .sctn..sctn. 1.181 and 1.515(c) to Reconsider Orders Denying Request for Ex Parte Reexamination of U.S. Pat. No. 5,818,630, in Reexamination Control No. 90/010,650 filed Aug. 19, 2009, dated Dec. 14, 2009, in 31 pages.
Decision Denying Petition to Reconsider Order Denying Request for Ex Parte Reexamination of U.S. Pat. No. 5,818,630, in Reexamination Control No. 90/010,650 filed Aug. 19, 2009, dated Jul. 30, 2010, in 8 pages.
Reexamination Information Disclosure Statement Filed by Third Party for U.S. Pat. No. 5,818,630, dated Aug. 19, 2009, in 1 page.
B. Desthieux et al., "111 kW (0.5 mJ) pulse amplification at 1.5 .mu.m using a gated cascade of three erbium-doped fiber amplifiers," Applied Physics Letters, vol. 63, No. 5, pp. 586-588, Aug. 1993.
M.J.F. Digonnet, "Passive and Active Fiber Optic Components," Stanford University Ph.D. dissertation, in 206 pages, Sep. 1983.
W.A. Gambling et al., "Mode Excitation in a Mulitmode Optical-Fibre Waveguide," Electronic Letters, vol. 9, pp. 412-414, Sep. 1973.
W.A. Gambling et al., "Pulse Dispersion for Single-Mode Operation of Multimode Cladded Optical Fibres," Electronics Letters, vol. 10, issue 9, pp. 148-149, May 1974.
T.F. Johnston Jr., "M2 concept characterizes beam quality," Laser Focus World, pp. 173-183, May 1990.
J.M. Senior, "Optical Fiber Communications: Principles and Practice," Prentice/Hall International, pp. 41-42, 73-76, 138-144, 1985.
L.M. Yang, "Generation and Amplification of Ultrashort Pulses in Erbium, Neodymium, and Thulium Fibers," University of Michigan Ph.D. dissertation, in 149 pages, Oct. 1996.
English translation of office action for German Patent Application No. 19861429, original dated Mar. 29, 2007, translation dated Jun. 28, 2010, in 5 pages.
Notice of opposition filed in the name of Ipg Laser GmbH for German Patent DE 19861429 owned by IMRA America, Inc., dated Jul. 15, 2010, in 1 page.
Opposition brief of IPG Laser GmbH filed with Patent Office regarding German Patent DE 19861429, dated Jul. 8, 2010, translation dated Oct. 11, 2010, in 54 pages.
English translation of reply by IMRA America, Inc. To Opposition of IPG Laser GmbH against German patent DE 198614292.2, dated Apr. 28, 2011, in 20 pages.
English translation of response to examination report of Jun. 28, 2010 for German Patent App. DE 19828154.4-51, dated Apr. 15, 2011, in 10 pages.
English translation of office action for Japanese Patent Application No. H11-334914, dated Dec. 15, 2008, in 4 pages.
English translation of filed amendments for Japanese Patent Application No. H11-334914, dated Nov. 9, 2009, in 5 pages.
Appeal brief for Japanese Patent Application No. H11-334914, dated Dec. 18, 2009, in 4 pages.
Section A—Power of attorney between IPG Photonics Corporation and Masatake Shiga et al. related to Request for Invalidation of Japanese Patent No. 3,990,034 B2, dated Mar. 4, 2010, in 2 pages.
Section B—Demand for Trial for invalidation of Japanese Patent No. 3,990,034 B2, requested by IPG Photonics Corporation, dated May 21, 2010, in 160 pages.
Section C—Declaration of Mariellen F. Calter in *IMRA America, Inc. v. IPG Photonics Corporation*, Case No. 2:06-15139, dated May 18, 2010, in 7 pages.
Section D—M.J.F. Digonnet, "Passive and Active Fiber Optic Components," Stanford University Ph.D. dissertation, Sep. 1983, and Japanese translation of highlighted portions, in 216 pages.
Section E—U.S. Pat. No. 5,187,759 to DiGiovanni et al. issued Feb. 16, 1993, and Japanese translation of highlighted portions, in 10 pages.
Section F—WO 1995020831 A1 to Wyatt et al., published Aug. 3, 1995, and its Japanese counterpart, JP H09-508239 A, Aug. 1997, in 60 pages.
Section G—B. Desthieux et al., "111 kW (0.5 mJ) pulse amplification at 1.5 .mu.m using a gated cascade of three erbium-doped fiber amplifiers," Applied Physics Letters, vol. 63, No. 5, pp. 586-588, Aug. 1993, and Japanese translation of highlighted portions, in 11 pages.
Section H—T.F. Johnston Jr., "M.sup.2 concept characterizes beam quality," Laser Focus World, pp. 173-183, May 1990, and Japanese translation of highlighted portions, in 15 pages.
Section I—Document relating to Section C, in 9 pages. English translation of the reply in the trial for patent invalidation No. 2010-800095 for Japanese Patent No. 3,990,034 B2, dated Sep. 27, 2010, in 26 pages.
English translation of Amendments for Japanese Patent Application No. H11-334914, dated Nov. 29, 2010, in 3 pages.
English translation of Appeal Brief filed by Appellant in Invalidation No. 2010-800095 regarding Japanese Patent No. 3,990,034 B2, dated Dec. 10, 2010, in 59 pages.
Exhibit A6—S.B. Poole et al., "Fabrication of Low-Loss Optical Fibres Containing Rare-Earth Ions," Electronics Letters, vol. 21, No. 17, pp. 737-738, Aug. 15, 1985, and Japanese translation of highlighted portions, in 4 pages.
Exhibit A7—W.A. Gambling et al., "Pulse Dispersion for Single-Mode Operation of Multimode Cladded Optical Fibres," Electronics Letters, vol. 10, No. 9, pp. 148-149, May 2, 1974, and Japanese translation of highlighted portions, in 3 pages.
Exhibit A8—J.M. Senior, "Optical Fiber Communications: Principle and Practice," pp. 41-42, 73-76, 138-144, dated 1984, and Japanese translation of highlighted portions, in 17 pages.
Exhibit A9—U.S. Pat. No. 4,546,476 to Shaw et al., issued Oct. 8, 1985, and highlighted Japanese translation, in 21 pages.
Exhibit A10—U.S. Pat. No. 5,818,630 to Fermann et al., issued Oct. 6, 1988, and Japanese translation of highlighted portions, in 21 pages.
Exhibit A11—Japanese Judgment Case No. 2004 (Wa) 12180 (Tokyo District Court), dated Nov. 2, 2005, in 19 pages.
Exhibit A12—Japanese Judgment Case No. 2006 (Ne) 10018 (Intellectual Property High Court), dated May 29, 2006, in 25 pages.
Exhibit A13—Japanese Judgment Case No. 2005 (Gyo-Ke) 10672 (Intellectual Property High Court), dated Apr. 17, 2006, in 35 pages.
Exhibit A14—W.A. Gambling et al., "Mode Conversion Coefficients in Optical Fibers," Applied Optics, vol. 14, No. 7, pp. 1538-1542, Jul. 1975, and Japanese translation of highlighted portions, in 7 pages.
Exhibit A15—U.S. Pat. No. 5,121,460 to Tumminelli et al., issued Jun. 9, 1992, and Japanese translation of highlighted portions, in 11 pages.
Exhibit A16—Japanese Patent Laid-Open No. 2007-221173, dated Aug. 30, 2007, in 20 pages.
Exhibit A17—U.S. Pat. No. 7,190,511 to Galvanauskas et al., issued Mar. 13, 2007, in 14 pages.
Summary of Oral Hearing Statement in Invalidation No. 2010-800095 regarding Japanese Patent No. 3,990,034 B2, dated Dec. 10, 2010, in 15 pages.
English translation of office action for Japanese Patent Application No. 2007-146684, dated Jan. 6, 2011, in 5 pages.
Solicitation in Invalidation No. 2010-800095 regarding Japanese Patent No. 3,990,034 B2, dated Jan. 28, 2011, in 7 pages.
English translation of Japanese Appeal Board Decision for Japanese Patent No. 3,990,034 B2, dated Feb. 18, 2011, in 53 pages.

(56) References Cited

OTHER PUBLICATIONS

H. Lin et al., "Colliding-pulse mode-locked lasers using Er-doped fiber and a semiconductor saturable absorber," Proc. Tech. Dig.: Conf. Lasers Electro-Optics (CLEO 95), JTuEI, pp. 72-73, May 1995, in 1 page.
Snyder, Allen et al., "Optical Waveguide Theory," Chapman and Hall, London, pp. 310-317, 1983.
Exhibit A36: Summary of paper CFD4 presented at Conf. on Lasers and Electro-Optics, CLEO'97, Optical Society of America held in May 1997 entitled "Cladding-pumped fiber laser/amplifier system generating 100 .mu.J energy picosecond pulse" by J. D. Minelly et al. and Japanese translation of highlighted portions, in 7 pages.
Notification from German Patent Office regarding German Patent No. DE 19828154 B4, dated Nov. 7, 2013, in 2 pages.
Reply by IMRA America, Inc. to Opposition dated Jul. 2, 2013 regarding German Patent No. DE 19828154, dated Feb. 11, 2014, in 66 pages.
U.S. Appl. No. 14/174,269, filed Feb. 6, 2014, in 33 pages.
Preliminary Amendment, dated Mar. 24, 2014, filed in U.S. Appl. No. 14/174,269, filed Feb. 6, 2014, in 8 pages.
Third Proceeding Report in Request for Cancellation of Trial Decision, Case No. 2011 (Gyo-ke) 10201 between IPG Photonics and IMRA America Inc., dated Apr. 17, 2012, in 3 pages.
Exhibit Explanation (2) of IMRA America, Inc. In Request for Cancellation of Trial Decision, Case No. 2011 (Gyo-ke) 10201 between IPG Photonics and IMRA America Inc., dated Apr. 9, 2012, in 1 page.
Translation of Exhibit B-4 to Exhibit Explanation (2), Technical Presentation Material (defendant) in Request for Cancellation of Trial Decision, Case No. 2011 (Gyo-ke) 10201 between IPG Photonics and IMRA America Inc., dated Apr. 17, 2012, in 109 pages.
Exhibit Explanation (4) of IPG Photonics Corporation in Request for Cancellation of Trial Decision, Case No. 2011 (Gyo-ke) 10201 between IPG Photonics and IMRA America Inc., dated Apr. 9, 2012, in 2 pages.
Exhibit A29 to Exhibit Explanation (4), Yoda, H. et al. "Beam Quality Factor of Higher Order Modes in a Step-Index Fiber," Mar. 2006, Journal of Lightwave Technology, vol. 24 No. 3, pp. 1350-1355, and Japanese translation of selected passages, in 7 pages.
Translation of Exhibit A30 to Exhibit Explanation (4), Presentation by IPG Photonics Inc. Technical Hearing—IP High Court) in Request for Cancellation of Trial Decision, Case No. 2011 H23-(Gyo-ke)-10201 between IPG Photonics and IMRA America Inc., dated Apr. 17, 2012, in 57 pages.
Translation of Fourth Proceeding Report in Request for Cancellation of Trial Decision, Case No. 2011 (Gyo-ke) 10201 between IPG Photonics and IMRA America Inc., dated Jun. 28, 2012, in 1 page.
Exhibit Explanation (3) of Imra America, Inc. In Request for Cancellation of Trial Decision, Case No. 2011 (Gyo-ke) 10201 between IPG Photonics and IMRA America Inc., dated May 7, 2012, in 2 pages.
Exhibit B4 to Exhibit Explanation (3), Japanese translations of selected passages from M.J.F. Digonnet, "Passive and Active Fiber Optic Components," Stanford University Ph.D. dissertation, Sep. 1983 (previously submitted in its entirety), in 15 pages.
Translation of Exhibit B5 to Exhibit Explanation (3), Supplemental Materials in Technical Presentation Material (defendant) in Request for Cancellation of Trial Decision, Case No. 2011 (Gyo-ke) 10201 between IPG Photonics and IMRA America Inc., dated May 7, 2012, in 10 pages.
Exhibit B6 to Exhibit Explanation (3), YLP Series: Pulsed, High Energy Ytterbium Fiber Lasers IPG Photonics product catalogue, submitted May 7, 2012, in 2 pages.
Translation of Examiner's Refusal Decision of Patent Application No. 2007-146684 to applicant IMRA America, dated Aug. 9, 2012, in 4 pages.
Translation of the Court decision and Exhibits, Intellectual High Court of Japan, Judgment on Request for cancellation of trial decision 2011 (Gyo-Ke) No. 10201, dated Sep. 27, 2012, in 54 pages.

Translation of Petitioner IMRA America's Statement of reasons for the petitioner for the acceptance of final appeal, Heisei (24) (2012) (Gyo-no) No. 10061, dated Dec. 27, 2012, in 13 pages.
English translation of IMRA America reply for Japanese Patent Application No. 2007-146684, dated Jul. 19, 2011, in 8 pages.
English translation of amendments for Japanese Patent Application No. 2007-146684, dated Jul. 19, 2011, in 4 pages.
IPG Photonics Corp. Complaint for Trial Case for Appeal Decision Cancellation Demand for JP Patent No. 3990034, dated Jun. 24, 2011 in 3 pages.
IPG Photonics Corp. Correction for Written Complaint for 2011 Gyo(Ke) No. 10201 Trial Case for Appeal Decision, dated Jul. 19, 2011 in 1 page.
IPG Photonics Corp. Explanation of Exhibits (1) for 2011 Gyo(Ke) No. 10201 Trial Case for Appeal Decision, dated Jul. 15, 2011 in 7 pages.
IMRA America Written Reply in 2011 (Gyo-ke) No. 10201 Trial Case for Appeal Decision, dated Jul. 21, 2011, including certificate of additional indication of specific infringement litigation representative work, in 3 pages.
IPG Brief in Request for cancellation of trial decision 2011 (Gyo-ke) No. 10201, dated Aug. 15, 2011, in 40 pages.
IPG Exhibit 26: Technology Trend Research Regarding High Performance Optical Fibers, dated Jul. 2001, in 21 pages.
Oral proceeding report in Request for cancellation of trial decision 2011 (Gyo-ke) No. 10201, dated Sep. 27, 2011, in 3 pages.
Exhibit table from "Request for Cancellation of Trial Decision 2011 (Gyo-ke) No. 10201", dated Nov. 14, 2011, in 2 pages. (Table includes Exhibits B-1 to B-3, listed separately below.).
Exhibit B-1: Tab 4: Declaration of Peter C. Schultz, dated May 27, 2009, in 4 pages.
Exhibit B-1: Tab 3: "Applying the teaching of Tumminelli to 'strip away' higher order modes", undated, in 2 pages.
Exhibit B-1: Tab 2: "Analysis of Tumminelli U.S. Pat. No. 5,818,620", undated, in 5 pages.
Exhibit B-2: Declaration of Dr. Wayne Harvey Knox regarding the reexamination of U.S. Pat. No. 5,818,620, dated May 31, 2009, in 22 pages.
Exhibit B-3: D. Marcuse, "Loss Analysis of Single-Mode Fiber Splices," Bell System Technical Journal, vol. 56, No. 5, May-Jun. 1977, pp. 703-718.
IMRA America Brief in Request for cancellation of trial decision 2011 (Gyo-ke) No. 10201, dated Nov. 14, 2011, in 51 pages.
Civil Docket for *IMRA America, Inc.* v. *IPG Photonics Corporation*, U.S. District Court, Eastern District of Michigan, Case #: 2:06-cv-15139-AJT-MKM, retrieved from the Public Access to Court Electronic Records (PACER) website (http://www.pacer.gov) on Dec. 19, 2011, in 45 pages.
Opinion and Order granting Plaintiffs Motion for Summary Judgment of No Invalidity for Derivation; Denying in part and Granting in part Defendant's Motion for Summary Judgment Regarding Damages Issues, Granting Plaintiffs Motion for Summary Judgment of No Inequitable Conduct; denying Defendant's Motion for Summary Judgment of No Infringement, Invalidity, and No Willful Infringement. Signed by District Judge Arthur J. Tarnow, dated Mar. 14, 2011, in 31 pages.
Stipulated Order for Dismissal, signed by District Judge Arthur J. Tarnow entered Nov. 1, 2011, in 2 pages.
Stipulated Order Re Amended Final Judgment and Amended Final Judgment by District Judge Arthur J. Tarnow, dated Nov. 21, 2011, in 4 pages.
Report on the Filing or Determination of an Action Regarding a Patent or Trademark, submitted to the Director of the U.S. Patent and Trademark Office, dated Nov. 14, 2011, in 1 page.
English translation of IMRA America's brief on Appeal of DE 198 61 429.2, Oct. 31, 2012, Munich, Germany, in 23 pages.
English translation of IPG Laser GmbH's reply brief to the submission of the patentee dated Apr. 28, 2011 on Appeal of DE 198 61 429.2, Oct. 31, 2012, Munich, Germany, in 12 pages.
English Translation of Decision on Appeal of DE 198 61 429.2, Dec. 5, 2012, Munich, Germany, in 18 pages.
English Translation of Claims after opposition on Appeal of DE 198 61 429.2, Dec. 19, 2012, Munich, Germany, in 2 pages.

(56) References Cited

OTHER PUBLICATIONS

Daniel, J.M.O., et al. "Novel Technique for Mode Selection in a Multimode Fiber Laser," Optics Express Jun. 13, 2011, vol. 19 No. 13, pp. 12434-12439.
Galvanauskas, A., et al. "Broad-Area Diode-Pumped 1 W Femtosecond Fiber System," Nov. 28, 1995, Optoelectronics Research Centre, University of Southampton, United Kingdom, in 9 pages.
Leger, James R. and William C. Goltsos, "Geometrical Transformation of Linear Diode-Laser Arrays for Longitudinal Pumping of Solid-State Lasers," IEEE Journal of Quantum Electronics, Apr. 1992, vol. 28 No. 4, pp. 1088-1100.
Marcuse, D. "Derivation of Coupled Power Equations," The Bell System Technical Journal, Jan. 1972, vol. 51 No. 1, pp. 229-237.
Minelly, J.D., et al. "Diode-Array Pumping of $Er^{3+}/Yb^{3+}$ Co-Doped Fiber Lasers and Amplifiers," IEEE Photonics Technology Letters, Mar. 1993, vol. 5 No. 5, pp. 301-303.
Minelly, J.D., et al. "Efficient Cladding Pumping of an $Er^{3+}$ Fibre," Optoelectronics Research Centre, Sep. 1995, University of Southampton, United Kingdom, in 4 pages.
Nilsson, J., et al. "High-Power and Tunable Operation of Erbium—Ytterbium Co-Doped Cladding-Pumped Fiber Lasers", IEEE Journal of Quantum Electronics, Aug. 2003, vol. 39 No. 8, pp. 987-994.
Olshansky, Robert, "Distortion Losses in Cabled Optical Fibers," Aug. 22, 1974, Corning Glass Works Research & Development Laboratories, New York, in 2 pages.
Olshansky, Robert, "Mode Coupling Effects in Graded-Index Optical Fibers," Applied Optics, Apr. 1975, vol. 14 No. 4, pp. 935-945.
Pask, H.M., et al. "Ytterbium-Doped Silica Fiber Lasers: Versatile Sources for the 1-1.2 $\mu m$ Region," IEEE Journal of Selected Topics in Quantum Electronics, Apr. 1995, vol. 1 No. 1, pp. 2-13.
Po, H., et al. "High Power Neodymium-Doped Single Transverse Mode Fibre Laser," Electronics Letters, Aug. 19, 1993, vol. 29 No. 17, pp. 1500-1501.
Zenteno, Luis, "High-Power Double-Clad Fiber Lasers, Journal of Lightwave Technology," Sep. 1993, vol. 11 No. 9, pp. 1435-1446.
"Lichtwellenleiter," http://de.wikipedia.org/wiki/Lichtwellenleiter, dated Oct. 31, 2012, in 29 pages.
"Optical Fiber Connector," http://en.wikipedia.org/wiki/Optical.sub.--fiber.sub.--connector, dated Apr. 29, 2011, in 7 pages.
"Corning SMF-28 Optical Fiber Product Information," model No. SMF-28, Corning Marketing Literature PI1036, Apr. 2002, New York, in 4 pages.
English translation of Plaintiff IPG Photonics Corporation's Second Brief to Intellectual Property High Court, Third Department, for Request for Cancellation of Trial Decision 2011 (Gyo-ke) No. 10201, dated Jan. 31, 2012, in 66 pages.
Exhibit Explanation (3) for Plaintiff IPG Photonics Corporation's Second Brief to Intellectual Property High Court, Third Department, for Request for Cancellation of Trial Decision 2011 (Gyo-ke) No. 10201, dated Jan. 31, 2012, in 2 pages.
Exhibit A-27, ECOC 2006 32nd European Conference on Optical Communication, Sep. 24-28, 2006, Cannes, France, ECOC 2006 Proceedings—vol. 6 "Robust Fundamental-Mode Operation in Ytterbium-doped Polarization—Maintaining Fibre with an Effective Area of $1400 \mu m^2$", X. Peng, et al. (annotated), with Japanese translation of annotation, in 5 pages.
Exhibit A-28, Electronics Letters 6th Sep. 1973 vol. 9 No. 18, "Mode Excitation in a Multimode Optical-Fibre Waveguide", W.A. Gambling et al., (annotated), with Japanese translation of annotations, in 6 pages.
English translation of Inquiry by Appeal Examiner in Appeal No. 2009-21679, JP Pat. App. No. H11-334914, assigned to IMRA America, Inc., dated Jul. 5, 2010, in 3 pages.
Written Reply to Inquiry by Appeal Examiner in Appeal No. 2009-21679, JP Pat. App. No. H11-334914, assigned to IMRA America, Inc., dated Oct. 22, 2010, in 7 pages.
Appeal Decision in Appeal No. 2009-21679, JP Pat. App. No. H11-334914, assigned to IMRA America, Inc., dated Dec. 8, 2010, in 3 pages.
Translation of Examination Report dated Feb. 3, 2009 in German Pat. Appl. No. DE 199 56 739.5-54, in 4 pages.
Translation of Response to Examination Report dated Feb. 3, 2009 in German Pat. Appl. No. DE 199 56 739.5-54, Jun. 16, 2009, in 5 pages.
Translation of claims filed with Response to Examination Report dated Feb. 3, 2009 in German Pat. Appl. No. DE 199 56 739.5-54, Jun. 16, 2009, in 8 pages.
Translation of Decision to grant in German Pat. Appl. No. DE 199 56 739.5-54, Aug. 25, 2009, in 3 pages.

* cited by examiner

MODE-LOCKED MULTI-MODE FIBER LASER PULSE SOURCE

RELATED APPLICATIONS

This application is a continuation of U.S. patent application Ser. No. 09/785,944 filed Feb. 16, 2001, which is a continuation of U.S. patent application Ser. No. 09/199,728 filed Nov. 25, 1998, now U.S. Pat. No. 6,275,512 issued Aug. 14, 2001.

FIELD OF THE INVENTION

The present invention relates to the amplification of single mode light pulses in multi-mode fiber amplifiers, and more particularly to the use of multi-mode amplifying fibers to increase peak pulse power in a mode-locked laser pulse source used for generating ultra-short optical pulses.

BACKGROUND OF THE INVENTION

Background Relating to Optical Amplifiers

Single-mode rare-earth-doped optical fiber amplifiers have been widely used for over a decade to provide diffraction-limited optical amplification of optical pulses. Because single mode fiber amplifiers generate very low noise levels, do not induce modal dispersion, and are compatible with single mode fiber optic transmission lines, they have been used almost exclusively in telecommunication applications.

The amplification of high peak-power pulses in a diffraction-limited optical beam in single-mode optical fiber amplifiers is generally limited by the small fiber core size that needs to be employed to ensure single-mode operation of the fiber. In general the onset of nonlinearities such as self-phase modulation lead to severe pulse distortions once the integral of the power level present inside the fiber with the propagation length exceeds a certain limiting value. For a constant peak power P inside the fiber, the tolerable amount of self-phase modulation $\Phi_{nl}$ is given by $$\Phi_{nl} = \frac{2\pi n_2 PL}{\lambda A} \leq 5,$$

where A is the area of the fundamental mode in the fiber, ë is the operation wavelength, L is the fiber length and $n_2 = 3.2 \times 10^{-20}$ m²/W is the nonlinear refractive index in silica optical fibers.

As an alternative to single-mode amplifiers, amplification in multi-mode optical fibers has been considered. However, in general, amplification experiments in multi-mode optical fibers have led to non-diffraction-limited outputs as well as unacceptable pulse broadening due to modal dispersion, since the launch conditions into the multi-mode optical fiber and mode-coupling in the multi-mode fiber have not been controlled.

Amplified spontaneous emission in a multi-mode fiber has been reduced by selectively exciting active ions close to the center of the fiber core or by confining the active ions to the center of the fiber core. U.S. Pat. No. 5,187,759, hereby incorporated herein by reference. Since the overlap of the low-order modes in a multi-mode optical fiber is highest with the active ions close to the center of the fiber core, any amplified spontaneous emission will then also be predominantly generated in low-order modes of the multi-mode fiber. As a result, the total amount of amplified spontaneous emission can be reduced in the multi-mode fiber, since no amplified spontaneous emission is generated in high-order modes.

As an alternative for obtaining high-power pulses, chirped pulse amplification with chirped fiber Bragg gratings has been employed. One of the limitations of this technique is the relative complexity of the set-up.

More recently, the amplification of pulses to peak powers higher than 10 KW has been achieved in multi-mode fiber amplifiers. See U.S. Pat. No. 5,818,630, entitled Single-Mode Amplifiers and Compressors Based on Multi-Mode Fibers, assigned to the assignee of the present invention, and hereby incorporated herein by reference. As described therein, the peak power limit inherent in single-mode optical fiber amplifiers is avoided by employing the increased area occupied by the fundamental mode within multi-mode fibers. This increased area permits an increase in the energy storage potential of the optical fiber amplifier, allowing higher pulse energies before the onset of undesirable nonlinearities and gain saturation. To accomplish this, that application describes the advantages of concentration of the gain medium in the center of the multi-mode fiber so that the fundamental mode is preferentially amplified. This gain-confinement is utilized to stabilize the fundamental mode in a fiber with a large cross section by gain guiding.

Additionally, that reference describes the writing of chirped fiber Bragg gratings onto multi-mode fibers with reduced mode-coupling to increase the power limits for linear pulse compression of high-power optical pulses. In that system, double-clad multi-mode fiber amplifiers are pumped with relatively large-area high-power semiconductor lasers. Further, the fundamental mode in the multi-mode fibers is excited by employing efficient mode-filters. By further using multi-mode fibers with low mode-coupling, the propagation of the fundamental mode in multi-mode amplifiers over lengths of several meters can be ensured, allowing the amplification of high-power optical pulses in doped multi-mode fiber amplifiers with core diameters of several tens of microns, while still providing a diffraction limited output beam. That system additionally employed cladding pumping by broad area diode array lasers to conveniently excite multi-mode fiber amplifiers.

BACKGROUND RELATING TO MODE-LOCKED LASERS

Both actively mode-locked lasers and passively mode-locked lasers are well known in the laser art. For example, compact mode-locked lasers have been formed as ultra-short pulse sources using single-mode rare-earth-doped fibers. One particularly useful fiber pulse source is based on Kerr-type passive mode-locking. Such pulse sources have been assembled using widely available standard fiber components to provide pulses at the bandwidth limit of rare-earth fiber lasers with GigaHertz repetition rates.

Semiconductor saturable absorbers have recently found applications in the field of passively mode-locked, ultrashort pulse lasers. These devices are attractive since they are compact, inexpensive, and can be tailored to a wide range of laser wavelengths and pulsewidths. Quantum well and bulk semiconductor saturable absorbers have also been used to mode-lock color center lasers A saturable absorber has an intensity-dependent loss l. The single pass loss of a signal of intensity I through a saturable absorber of thickness d may be expressed as $l = 1 - \exp(-\alpha d)$ in which α is the intensity dependent absorption coefficient given by:

$$\alpha(I) = \alpha_0/(1 + I/I_{SAT})$$

Here $\alpha_0$ is the small signal absorption coefficient, which depends upon the material in question. $I_{SAT}$ is the saturation intensity, which is inversely proportional to the lifetime ($\tau_A$) of the absorbing species within the saturable absorber. Thus, saturable absorbers exhibit less loss at higher intensity.

Because the loss of a saturable absorber is intensity dependent, the pulse width of the laser pulses is shortened as they pass through the saturable absorber. How rapidly the pulse width of the laser pulses is shortened is proportional to $|dq_0/dI|$, in which $q_0$ is the nonlinear loss:

$$q_0 = l(I) - l(I=0)$$

$l(I=0)$ is a constant $(=1-\exp(-\alpha_0 d))$ and is known as the insertion loss. As defined herein, the nonlinear loss $q_0$ of a saturable absorber decreases (becomes more negative) with increasing intensity I. $|dq_0/dI|$ stays essentially constant until I approaches $I_{SAT}$, becoming essentially zero in the bleaching regime, i.e., when $I >> I_{SAT}$.

For a saturable absorber to function satisfactorily as a mode-locking element, it should have a lifetime (i.e., the lifetime of the upper state of the absorbing species), insertion loss $l(I=0)$, and nonlinear loss $q_0$ appropriate to the laser. Ideally, the insertion loss should be low to enhance the laser's efficiency, whereas the lifetime and the nonlinear loss $q_0$ should permit self-starting and stable cw mode-locking. The saturable absorber's characteristics, as well as laser cavity parameters such as output coupling fraction, residual loss, and lifetime of the gain medium, all play a role in the evolution of a laser from startup to mode-locking.

As with single-mode fiber amplifiers, the peak-power of pulses from mode-locked single-mode lasers has been limited by the small fiber core size that has been employed to ensure single-mode operation of the fiber. In addition, in mode-locked single-mode fiber lasers, the round-trip nonlinear phase delay also needs to be limited to around ð to prevent the generation of pulses with a very large temporally extended background, generally referred to as a pedestal. For a standard mode-locked single-mode erbium fiber laser operating at 1.55 μm with a core diameter of 10 μm and a round-trip cavity length of 2 m, corresponding to a pulse repetition rate of 50 MHz, the maximum oscillating peak power is thus about 1 KW.

The long-term operation of mode-locked single-mode fiber lasers is conveniently ensured by employing an environmentally stable cavity as described in U.S. Pat. No. 5,689,519, entitled Environmentally Stable Passively Mode-locked Fiber Laser Pulse Source, assigned to the assignee of the present invention, and hereby incorporated herein by reference. The laser described in this reference minimizes environmentally induced fluctuations in the polarization state at the output of the single-mode fiber. In the described embodiments, this is accomplished by including a pair of Faraday rotators at opposite ends of the laser cavity to compensate for linear phase drifts between the polarization eigenmodes of the fiber.

Recently the reliability of high-power single-mode fiber lasers passively mode-locked by saturable absorbers has been greatly improved by implementing non-linear power limiters by insertion of appropriate semiconductor two-photon absorbers into the cavity, which minimizes the peak power of the damaging Q-switched pulses often observed in the start-up of mode-locking and in the presence of misalignments of the cavity. See U.S. patent application Ser. No. 09/149,369, filed on Sep. 8, 1998, entitled Resonant Fabry-Perot Semiconductor Saturable Absorbers and Two-Photon Absorption Power Limiters, assigned to the assignee of the present invention, and hereby incorporated herein by reference.

To increase the pulse energy available from mode-locked single-mode fiber lasers the oscillation of chirped pulses inside the laser cavity has been employed. M. Hofer et al., Opt. Lett., vol. 17, page 807-809. As a consequence the pulses are temporally extended, giving rise to a significant peak power reduction inside the fiber laser. However, the pulses can be temporally compressed down to approximately the bandwidth limit outside the laser cavity. Due to the resulting high peak power, bulk-optic dispersive delay lines have to be used for pulse compression. For neodymium fiber lasers, pulse widths of the order of 100 fs can be obtained.

The pulse energy from mode-locked single-mode fiber lasers has also been increased by employing chirped fiber gratings. The chirped fiber gratings have a large amount of negative dispersion, broadening the pulses inside the cavity dispersively, which therefore reduces their peak power and also leads to the oscillation of high-energy pulses inside the single-mode fiber lasers.

See U.S. Pat. No. 5,450,427, entitled Technique for the Generation of Optical Pulses in Mode-Locked Lasers by Dispersive Control of the Oscillation Pulse Width, and U.S. Pat. No. 5,627,848, entitled Apparatus for Producing Femtosecond and Picosecond Pulses from Fiber Lasers Cladding Pumped with Broad Area Diode Laser Arrays, both of which are assigned to the assignee of the present invention and hereby incorporated herein by reference. In these systems, the generated pulses are bandwidth-limited, though the typical oscillating pulse widths are of the order of a few ps.

However, though the dispersive broadening of the pulse width oscillating inside a single-mode fiber laser cavity does increase the oscillating pulse energy compared to a 'standard' soliton fiber laser, it does not increase the oscillating peak power. The maximum peak power generated with these systems directly from the fiber laser is still limited to around 1 KW.

Another highly integratable method for increasing the peak power of mode-locked lasers is based on using chirped periodically poled LiNbO$_3$ (chirped PPLN). Chirped PPLN permits simultaneous pulse compression and frequency doubling of an optically chirped pulse. See U.S. patent application Ser. No. 08/845,410, filed on Apr. 25, 1997, entitled Use of Aperiodic Quasi-Phase-Matched Gratings in Ultrashort Pulse Sources, assigned to the assignee of the present application, and hereby incorporated herein by reference. However, for chirped PPLN to produce pulse compression from around 3 ps to 300 fs and frequency doubling with high conversion efficiencies, generally peak powers of the order of several KW are required. Such high peak powers are typically outside the range of mode-locked single-mode erbium fiber lasers.

Broad area diode laser arrays have been used for pumping of mode-locked single-mode fiber lasers, where very compact cavity designs were possible. The pump light was injected through a V-groove from the side of double-clad fiber, a technique typically referred to as side-pumping. However, such oscillator designs have also suffered from peak power limitations due to the single-mode structure of the oscillator fiber.

It has also been suggested that a near diffraction-limited output beam can be obtained from a multi-mode fiber laser when keeping the fiber length shorter than 15 mm and selectively providing a maximum amount of feedback for the fundamental mode of the optical fiber. "Efficient laser operation with nearly diffraction-limited output from a diode-pumped heavily Nd-doped multi-mode fiber", Optics Letters, Vol. 21, pp. 266-268 (1996) hereby incorporated herein by reference. In this technique, however, severe mode-coupling has been a problem, as the employed multi-mode fibers typically support thousands of modes. Also, only an air-gap between the endface of the multi-mode fiber and a laser mirror has been suggested for mode-selection. Hence, only very poor modal discrimination has been obtained, resulting in poor beam quality.

While the operation of optical amplifiers, especially in the presence of large seed signals, is not very sensitive to the presence of spurious reflections, the stability of mode-locked lasers critically depends on the minimization of spurious reflections. Any stray reflections produce sub-cavities inside an oscillator and result in injection signals for the cw operation of a laser cavity and thus prevent the onset of mode-locking. For solid-state Fabry-Perot cavities a suppression of intra-cavity reflections to a level <<1% (in intensity) is generally believed to be required to enable the onset of mode-locking.

The intra-cavity reflections that are of concern in standard mode-locked lasers can be thought of as being conceptually equivalent to mode-coupling in multi-mode fibers. Any mode-coupling in multi-mode fibers clearly also produces a sub-cavity with a cw injection signal proportional to the amount of mode-coupling. However, the suppression of mode-coupling to a level of <<1% at any multi-mode fiber discontinuities is very difficult to achieve. Due to optical aberrations, even well-corrected optics typically allow the excitation of the fundamental mode in multi-mode fibers only with maximum efficiency of about 95%. Therefore to date, it has been considered that mode-locking of a multi-mode fiber is impossible and no stable operation of a mode-locked multi-mode fiber laser has yet been demonstrated.

SUMMARY OF THE INVENTION

This invention overcomes the foregoing difficulties associated with peak power limitations in mode-locked lasers, and provides a mode-locked multi-mode fiber laser.

This laser utilizes cavity designs which allow the stable generation of high peak power pulses from mode-locked multi-mode fiber lasers, greatly extending the peak power limits of conventional mode-locked single-mode fiber lasers. Mode-locking may be induced by insertion of a saturable absorber into the cavity and by inserting one or more mode-filters to ensure the oscillation of the fundamental mode in the multi-mode fiber. The probability of damage of the absorber may be minimized by the insertion of an additional semiconductor optical power limiter into the cavity. The shortest pulses may also be generated by taking advantage of nonlinear polarization evolution inside the fiber. The long-term stability of the cavity configuration is ensured by employing an environmentally stable cavity. Pump light from a broad-area diode laser may be delivered into the multi-mode fiber by employing a cladding-pumping technique.

With this invention, a mode-locked fiber laser may be constructed to obtain, for example, 360 fsec near-bandwidth-limited pulses with an average power of 300 mW at a repetition rate of 66.7 MHz. The peak power of these exemplary pulses is estimated to be about 6 KW.

BRIEF DESCRIPTION OF THE DRAWINGS

The following description of the preferred embodiments of the invention references the appended drawings, in which like elements bear identical reference numbers throughout.

DETAILED DESCRIPTION OF THE PREFERRED EMBODIMENT

Figure 1:
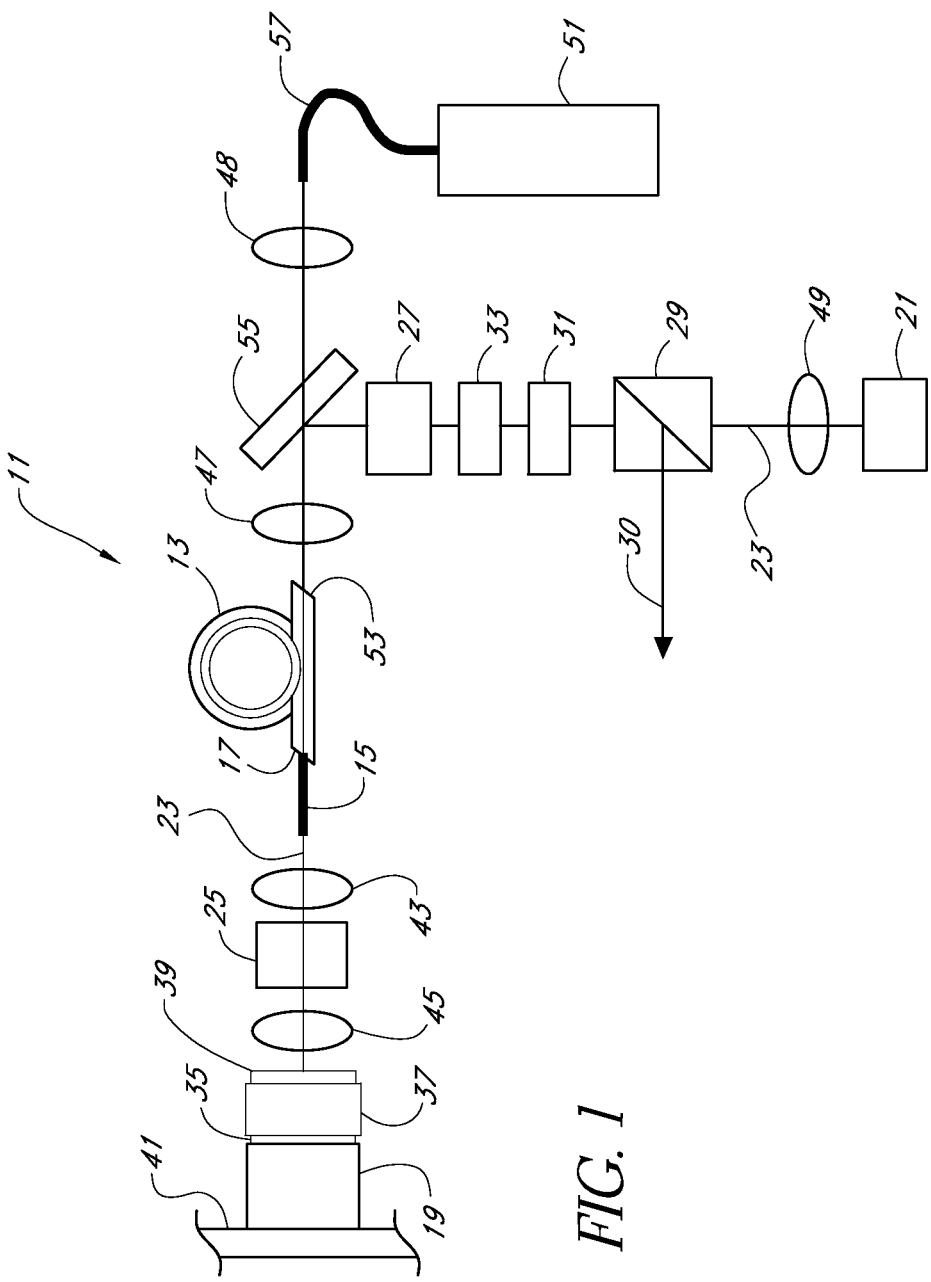
FIG. 1 is a schematic illustration showing the construction of a preferred embodiment of the present invention which utilizes end-pumping for injecting pump light into the multi-mode fiber.

FIG. 1 illustrates the mode-locked laser cavity 11 of this invention which uses a length of multi-mode amplifying fiber 13 within the cavity to produce ultra-short, high-power optical pulses. As used herein, "ultra-short" means a pulse width below 100 ps. The fiber 13, in the example shown, is a 1.0 m length of non-birefringent $Yb^{3+}/Er^{3+}$-doped multi-mode fiber. Typically, a fiber is considered multi-mode when the V-value exceeds 2.41, i.e., when modes in addition to the fundamental mode can propagate in the optical fiber. This fiber is coiled onto a drum with a diameter of 5 cm, though bend diameters as small as 1.5 cm, or even smaller, may be used without inhibiting mode-locking. Due to the $Er^{3+}$ doping, the fiber core in this example has an absorption of approximately 40 dB/m at a wavelength of 1.53 µm. The $Yb^{3+}$ co-doping produces an average absorption of 4.3 dB/m inside the cladding at a wavelength of 980 nm. The fiber 13 has a numerical aperture of 0.20 and a core diameter of 16 µm. The outside diameter of the cladding of the fiber 13 is 200 µm. The fiber 13 is coated with a low-index polymer producing a numerical aperture of 0.40 for the cladding. A 10 cm length of single-mode Corning Leaf fiber 15 is thermally tapered to produce a core diameter of approximately 14 µm to ensure an optimum operation as a mode filter, and this length is fusion spliced onto a first end 17 of the multi-mode fiber 13.

In this exemplary embodiment, the cavity 11 is formed between a first mirror 19 and a second mirror 21. It will be recognized that other cavity configurations for recirculating pulses are well known, and may be used. In this example, the mirrors 19, 21 define an optical axis 23 along which the cavity elements are aligned.

The cavity 11 further includes a pair of Faraday rotators 25, 27 to compensate for linear phase drifts between the polarization eigenmodes of the fiber, thereby assuring that the cavity remains environmentally stable. As referenced herein, the phrase "environmentally stable" refers to a pulse source which is substantially immune to a loss of pulse generation due to environmental influences such as temperature drifts and which is, at most, only slightly sensitive to pressure variations. The use of Faraday Rotators for assuring environmental stability is explained in more detail in U.S. Pat. No. 5,689,519 which has been incorporated by reference herein.

A polarization beam-splitter 29 on the axis 23 of the cavity 11 ensures single-polarization operation of the cavity 11, and provides the output 30 from the cavity. A half-wave plate 31 and a quarter-wave plate 33 are used to introduce linear phase delays within the cavity, providing polarization control to permit optimization of polarization evolution within the cavity 11 for mode-locking.

To induce mode-locking, the cavity 11 is formed as a Fabry-Perot cavity by including a saturable absorber 35 at the end of the cavity proximate the mirror 19. The saturable absorber 35 is preferably grown as a 0.75 µm thick layer of InGaAsP on one surface of a substrate. The band-edge of the InGaAsP saturable absorber 39 is preferably chosen to be 1.56 µm, the carrier life-time is typically 5 ps and the saturation energy density is 100 MW/cm$^2$.

In this example, the substrate supporting the saturable absorber 35 comprises high-quality anti-reflection-coated InP 37, with the anti-reflection-coated surface 39 facing the open end of the cavity 11. The InP substrate is transparent to single-photon absorption of the signal light at 1.56 µm, however two photon absorption occurs. This two-photon absorber 39 is used as a nonlinear power limiter to protect the saturable absorber 35.

The mirror 19 in this exemplary embodiment is formed by depositing a gold-film onto the surface of the InGaAsP saturable absorber 35 opposite the two photon absorber 39. The combined structure of the saturable absorber 35, two photon absorber 37 and mirror 19 provides a reflectivity of 50% at 1.56 µm. The surface of the gold-film mirror 19 opposite the saturable absorber 35 is attached to a sapphire window 41 for heat-sinking the combined absorber/mirror assembly.

The laser beam from the fiber 15 is collimated by a lens 43 and refocused, after rotation by the Faraday rotator 25, by a lens 45 onto the anti-reflection-coated surface 39 of the two-photon absorber 37. The spot size of the laser beam on the saturable absorber 35 may be adjusted by varying the position of the lens 45 or by using lenses with different focal lengths. Other focusing lenses 47 and 49 in the cavity 11 aid in better imaging the laser signal onto the multi-mode fiber 13.

Light from a Pump light source 51, such as a laser source, with a wavelength near 980 nm and output power of 5 W, is directed through a fiber bundle 57 with an outside diameter of 375 µm. This pump light is injected into the end 53 of the multi-mode fiber 13 opposite the single-mode fiber 17. The pump light is coupled into the cavity 11 via a pump signal injector 55, such as a dichroic beam-splitter for 980/1550 nm. Lenses 47 and 48 are optimized for coupling of the pump power from the fiber bundle 57 into the cladding of the multi-mode fiber.

The M$^2$-value of the beam at the output 30 of this exemplary embodiment is typically approximately 1.2. Assuming the deterioration of the M$^2$-value is mainly due to imperfect splicing between the multi-mode fiber 13 and the single-mode mode-filter fiber 15, it can be estimated that the single-mode mode-filter fiber 15 excited the fundamental mode of the multi-mode fiber 13 with an efficiency of approximately 90%.

Mode-locking may be obtained by optimizing the focusing of the laser beam on the saturable absorber 35 and by optimizing the orientation of the intra-cavity waveplates 31, 33 to permit some degree of nonlinear polarization evolution. However, the mode-locked operation of a multi-mode fiber laser system without nonlinear polarization evolution can also be accomplished by minimizing the amount of mode-mixing in the multi-mode fiber 13 and by an optimization of the saturable absorber 35.

Figure 2:
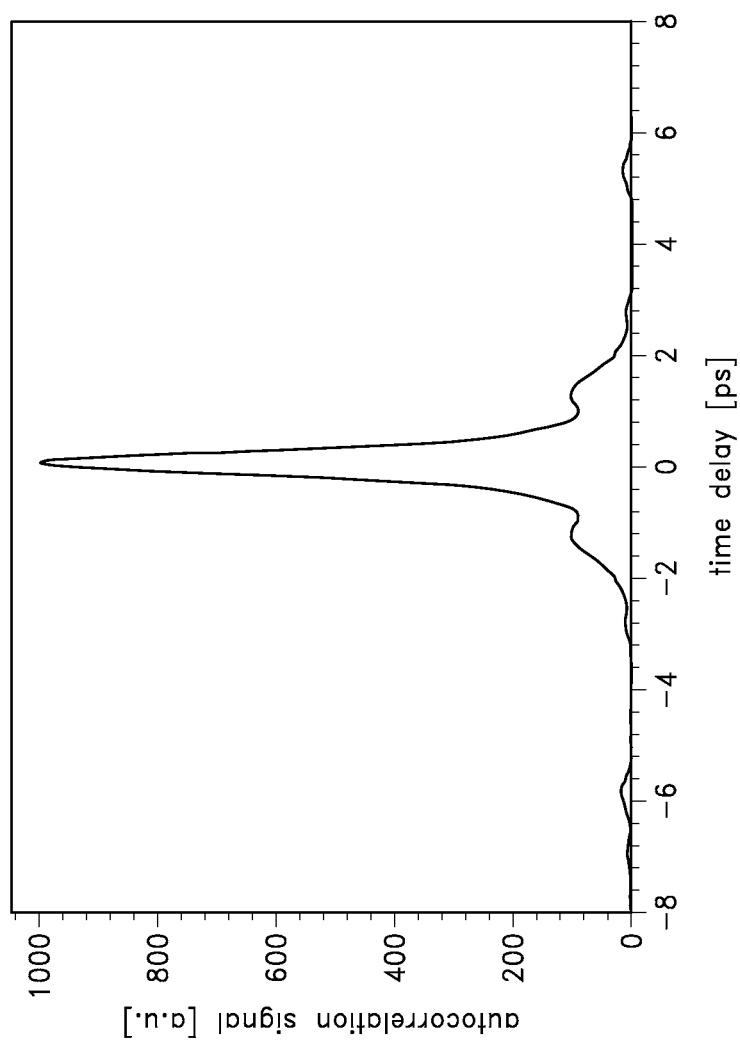
FIG. 2 is a graph showing the typical autocorrelation of pulses generated by the invention of FIG. 1.
Figure 3:
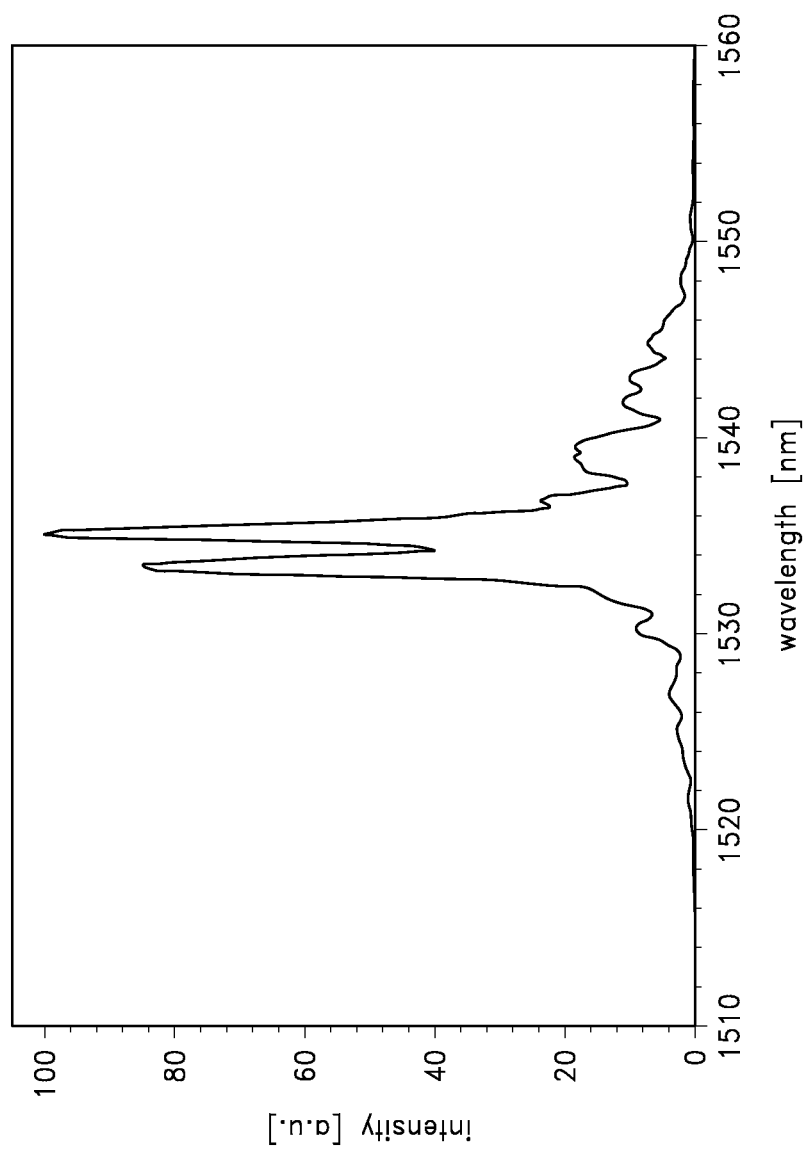
FIG. 3 is a graph showing the typical pulse spectrum generated by the invention of FIG. 1.

The pulses which are generated by the exemplary embodiment of FIG. 1 will have a repetition rate of 66.7 MHz, with an average output power of 300 mW at a wavelength of 1.535 µm, giving a pulse energy of 4.5 nJ. A typical autocorrelation of the pulses is shown in FIG. 2. A typical FWHM pulse width of 360 fsec (assuming a sech$^2$ pulse shape) is generated. The corresponding pulse spectrum is shown in FIG. 3. The autocorrelation width is within a factor of 1.5 of the bandwidth limit as calculated from the pulse spectrum, which indicates the relatively high quality of the pulses.

Due to the multi-mode structure of the oscillator, the pulse spectrum is strongly modulated and therefore the autocorrelation displays a significant amount of energy in a pulse pedestal. It can be estimated that the amount of energy in the pedestal is about 50%, which in turn gives a pulse peak power of 6 KW, about 6 times larger than what is typically obtained with single-mode fibers at a similar pulse repetition rate.

Neglecting the amount of self-phase modulation in one pass through the multi-mode fiber 13 and any self-phase modulation in the mode-filter 15, and assuming a linear increase of pulse power in the multi-mode fiber 13 in the second pass, and assuming an effective fundamental mode area in the multi-mode fiber 13 of 133 µm$^2$, the nonlinear phase delay in the multi-mode oscillator is calculated from the first equation above as $\Phi_{nl}=1.45\tau$, which is close to the expected maximum typical nonlinear delay of passively mode-locked lasers.

The modulation on the obtained pulse spectrum as well as the amount of generated pedestal is dependent on the alignment of the mirror 21. Generally, optimized mode-matching of the optical beam back into the fundamental mode of the multi-mode fiber leads to the best laser stability and a reduction in the amount of pedestal and pulse spectrum modulation. For this reason, optimized pulse quality can be obtained by improving the splice between the single-mode filter fiber 15 and the multi-mode fiber 13. From simple overlap integrals it can be calculated that an optimum tapered section of Corning SMF-28 fiber 15 will lead to an excitation of the fundamental mode in the multi-mode fiber 13 with an efficiency of 99%. Thus any signal in higher-order modes can be reduced to about 1% in an optimized system.

Figure 4:
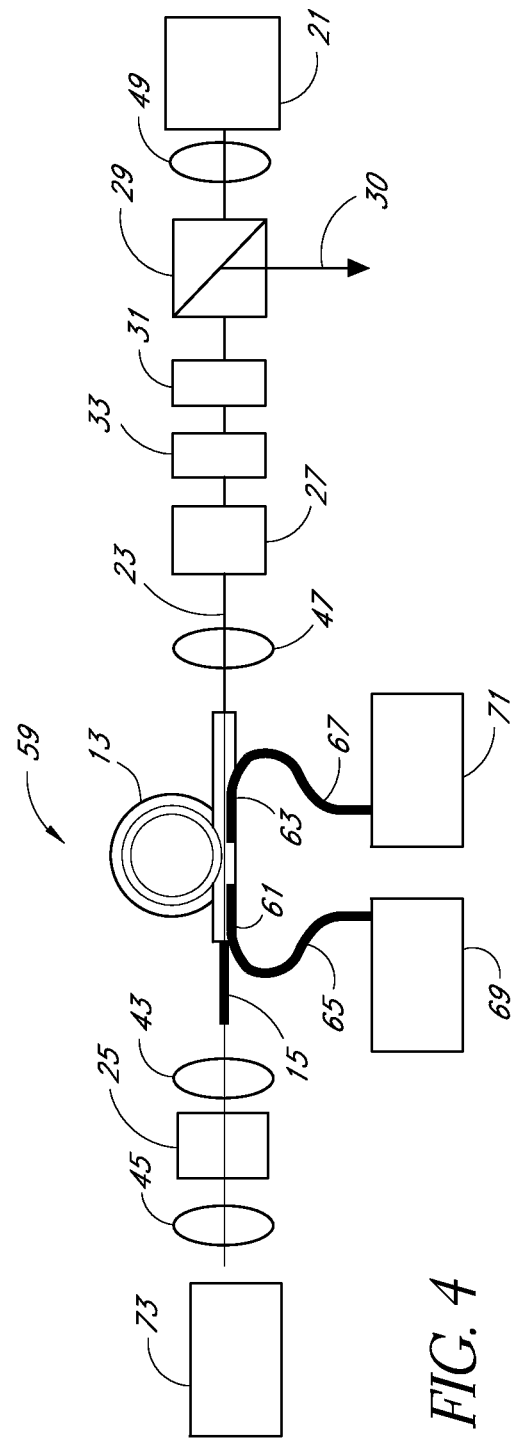
FIG. 4 is a schematic illustration showing the construction of an alternate preferred embodiment utilizing a side-pumping mechanism for injecting pump light into the multi-mode fiber.

An alternate embodiment of the invention is illustrated in FIG. 4. As indicated by the identical elements and reference numbers, most of the cavity arrangement in this figure is identical to that shown in FIG. 1. This embodiment provides a highly integrated cavity 59 by employing a side-pumping mechanism for injecting pump light into the multi-mode fiber 13. A pair of fiber couplers 61, 63, as are well known in the art, inject light from a respective pair of fiber bundles 65 and 67 into the cladding of the multi-mode fiber 13. The fiber bundles are similar to bundle 57 shown in FIG. 1, and convey light from a pair of pump sources 69 and 71, respectively. Alternatively, the fiber bundles 65, 67 and couplers 61, 63 may be replaced with V-groove light injection into the multi-mode fiber cladding in a manner well known in the art. A saturable absorber 73 may comprise the elements 35, 37, 39 and 41 shown in FIG. 1, or may be of any other well known design, so long as it provides a high damage threshold.

Figure 5:
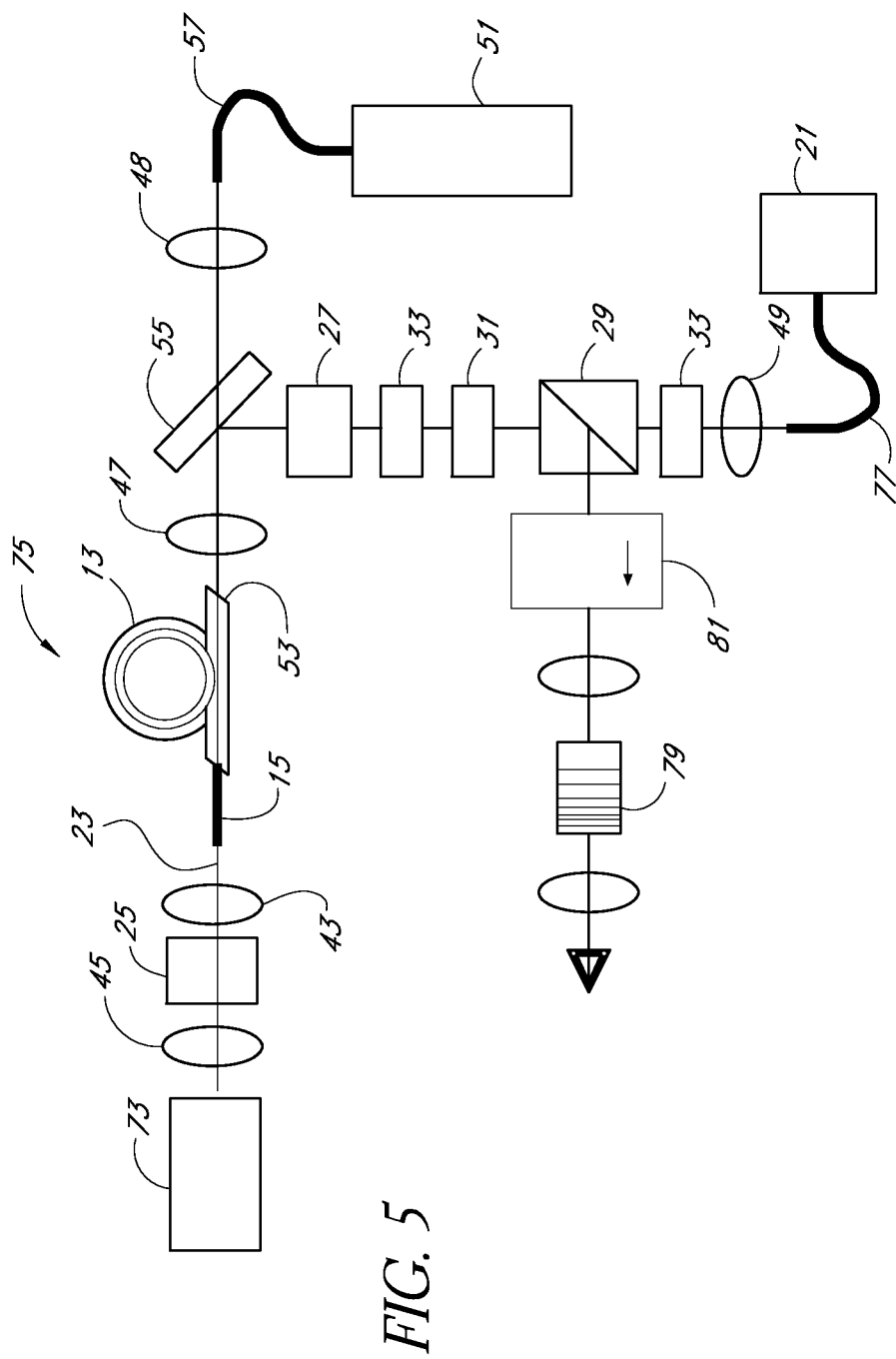
FIG. 5 is a schematic illustration of an alternative embodiment which uses a length of positive dispersion fiber to introduce chirped pulses into the cavity.

In another alternate embodiment of the invention, illustrated in FIG. 5, the laser cavity 75 includes a positive dispersion element. As with FIG. 4, like reference numbers in FIG. 5 identify elements described in detail with reference to FIG. 1. In this embodiment, a section of single-mode positive dispersion fiber 77 is mounted between the second mirror 21 and the lens 49. In a similar manner, a section of positive dispersion fiber could be spliced onto the end 53 of the multi-mode fiber 13, or the end of the single-mode mode-filter 15 facing the lens 43. Positive dispersion fibers typically have a small core area, and may limit the obtainable pulse energy from a laser. The embodiment shown in FIG. 5 serves to reduce the peak power injected into the positive dispersion fiber 77, and thus maximize the pulse energy output. This is accomplished by extracting, at the polarization beam splitter 29, as much as 90-99% of the light energy.

In the embodiment of FIG. 5, the total dispersion inside the cavity may be adjusted to be zero to generate high-power pulses with a larger bandwidth. Alternatively, by adjusting the total cavity dispersion to be positive, chirped pulses with significantly increased pulse energies may be generated by the laser.

The use of two single-mode mode-filter fibers 15, 77 is also beneficial in simplifying the alignment of the laser. Typically, to minimize modal speckle, broad bandwidth optical signals need to be used for aligning the mode-filter fibers with the multi-mode fiber. The use of two mode-filter fibers 15, 77 allows the use of amplified spontaneous emission signals generated directly in the multi-mode fiber for an iterative alignment of both mode-filters 15, 77.

The chirped pulses generated in the cavity 75 with overall positive dispersion may be compressed down to approximately the bandwidth limit at the frequency doubled wavelength by employing chirped periodically poled $LiNbO_3$ 79 for sum-frequency generation, in a manner well known in the art. The chirped periodically poled $LiNbO_3$ 79 receives the cavity output from the polarization beam splitter 29 through an optical isolator 81. In this case, due to the high power capabilities of multi-mode fiber oscillators, higher frequency-doubling conversion efficiencies occur compared to those experienced with single-mode fiber oscillators. Alternatively, bulk-optics dispersion compensating elements may be used in place of the chirped periodically poled $LiNbO_3$ 79 for compressing the chirped pulses down to the bandwidth limit.

Generally, any nonlinear optical mixing technique such as frequency doubling, Raman generation, four-wave mixing, etc. may be used in place of the chirped periodically poled $LiNbO_3$ 79 to frequency convert the output of the multi-mode oscillator fiber 13 to a different wavelength. Moreover, the conversion efficiency of these nonlinear optical mixing processes is generally proportional to the light intensity or light intensity squared. Thus, the small residual pedestal present in a multi-mode oscillator would be converted with greatly reduced efficiency compared to the central main pulse and hence much higher quality pulses may be obtained.

Figure 6:
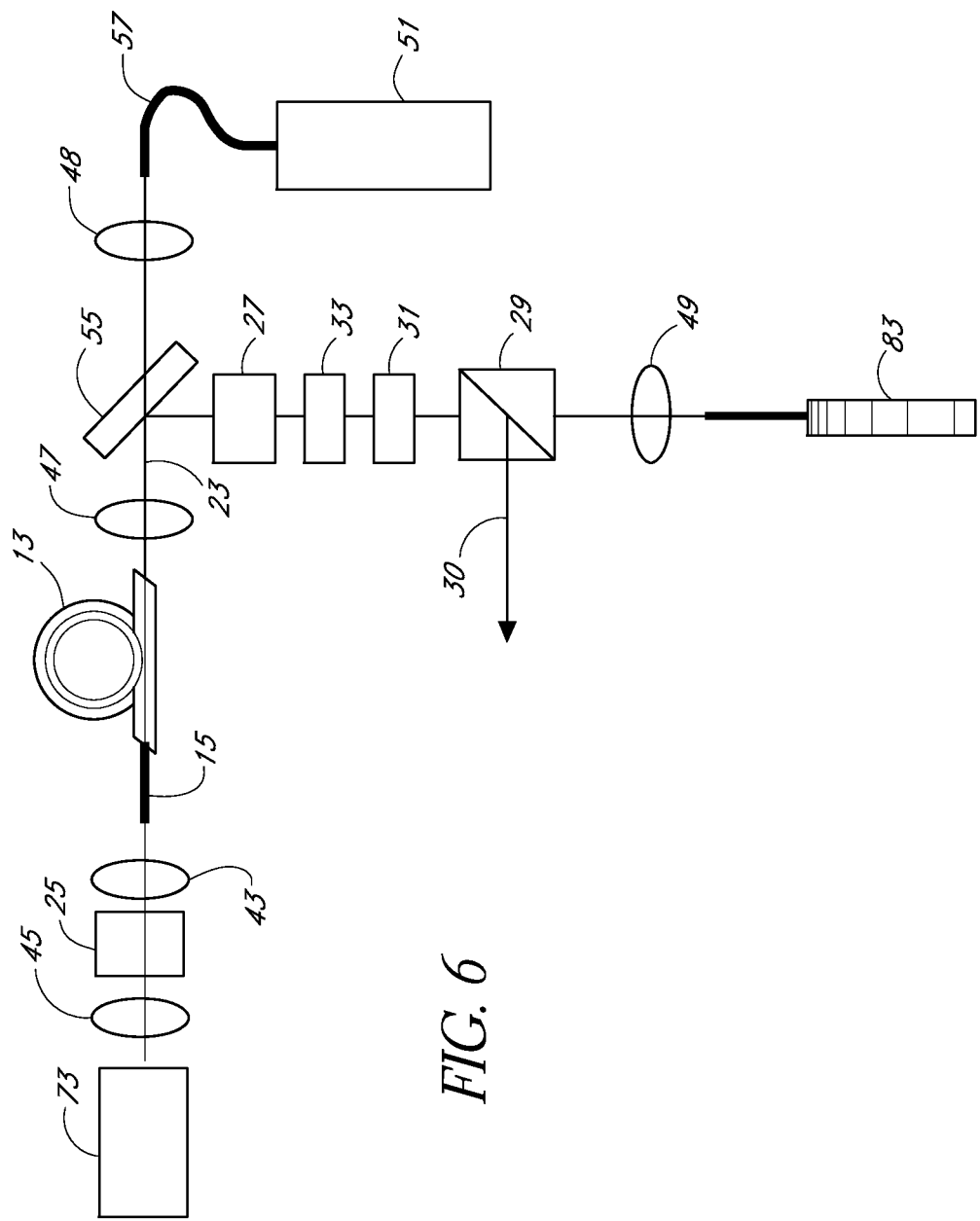
FIG. 6 is a schematic illustration of an alternative embodiment which uses chirped fiber gratings with negative dispersion in the laser cavity to produce high-energy, near bandwidth-limited pulses.

As shown in the alternate embodiment of FIG. 6, very high-energy optical pulses may also be obtained by inserting a chirped fiber grating such as a Bragg grating 83, with negative dispersion, into the cavity 85. Such a system typically produces ps length, high-energy, approximately bandwidth-limited pulses. Due to the multi-mode fiber used, much greater peak powers compared to single-mode fiber oscillators are generated. Here the fiber grating 83 is inserted after the polarization beam splitter 29 to obtain an environmentally-stable cavity even in the presence of nonpolarization maintaining multi-mode fiber 13.

In each of the embodiments of this invention, it is advantageous to minimize saturation of the multi-mode fiber amplifier 13 by amplified spontaneous emission generated in higher-order modes. This may be accomplished by confining the rare-earth doping centrally within a fraction of the core diameter.

Figure 7B:
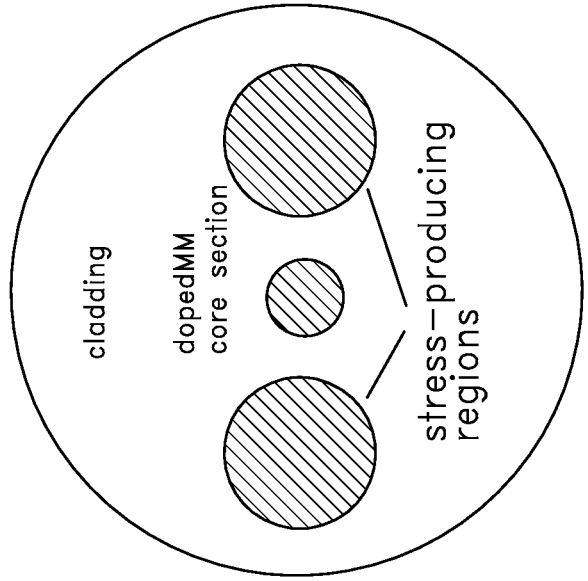
FIGS. 7A and 7B illustrate polarization-maintaining multi-mode fiber cross sections which may be used to construct environmentally stable cavities in the absence of Faraday rotators.
Figure 7A:
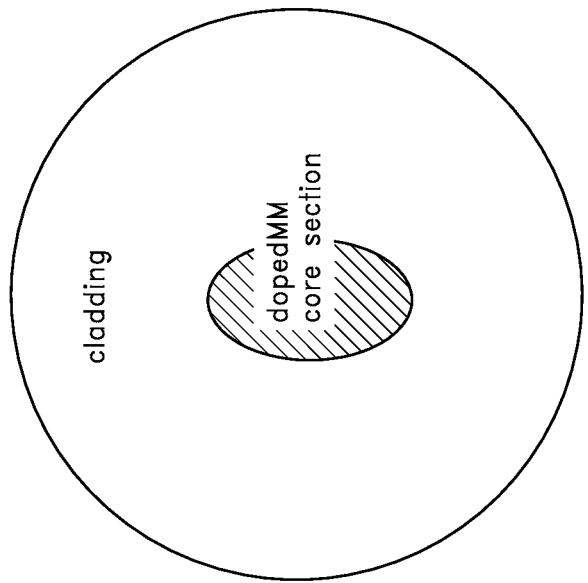
Figure 8:
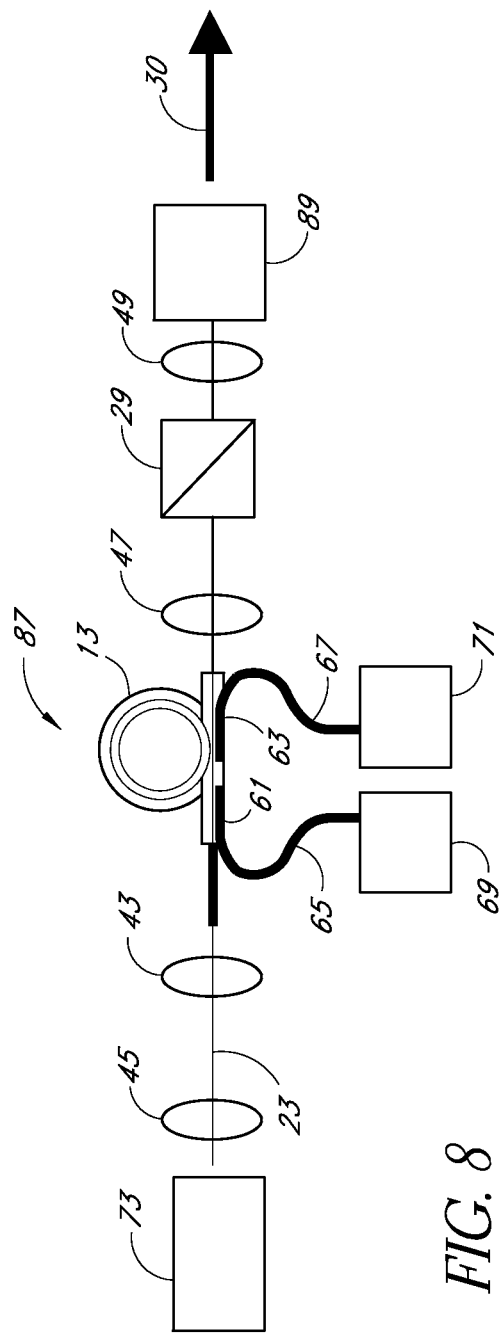
FIG. 8 is a schematic illustration of an alternative embodiment which utilizes one of the fibers illustrated in FIGS. 7A and 7B.

Polarization-maintaining multi-mode optical fiber may be constructed by using an elliptical fiber core or by attaching stress-producing regions to the multi-mode fiber cladding. Examples of such fiber cross-sections are shown in FIGS. 7A and 7B, respectively. Polarization-maintaining multi-mode fiber allows the construction of environmentally stable cavities in the absence of Faraday rotators. An example of such a design is shown in FIG. 8 in this case, the output of the cavity 87 is provided by using a partially-reflecting mirror 89 at one end of the cavity 87, in a manner well known in this art.

Figure 9A:
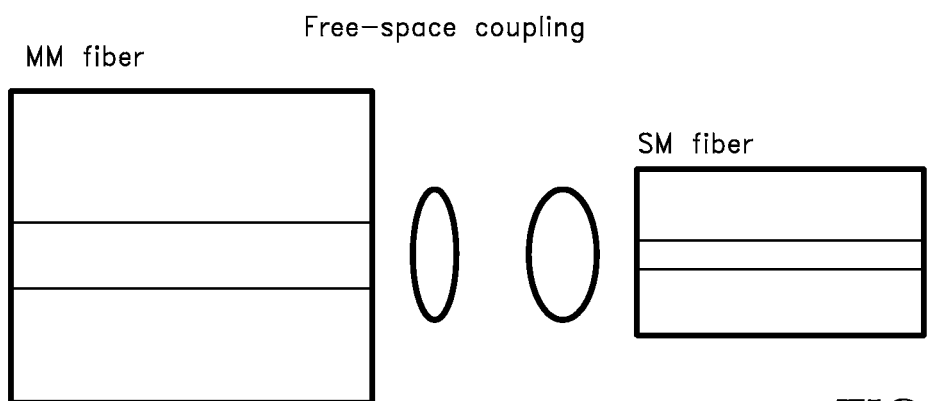
FIGS. 9A, 9B and 9C illustrate the manner in which the fundamental mode of the multi-mode fibers of the present invention may be matched to the mode of a single mode fiber. These include a bulk optic imaging system, as shown in FIG. 9A, a multi-mode to single-mode splice, as shown in FIG. 9B, and a tapered section of multi-mode fiber, as illustrated in FIG. 9C.
Figure 9B:
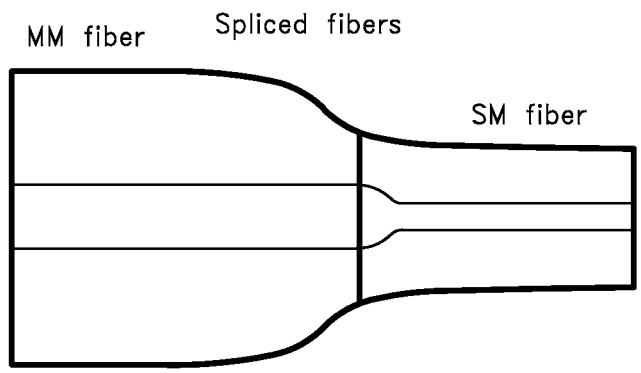
Figure 9C:
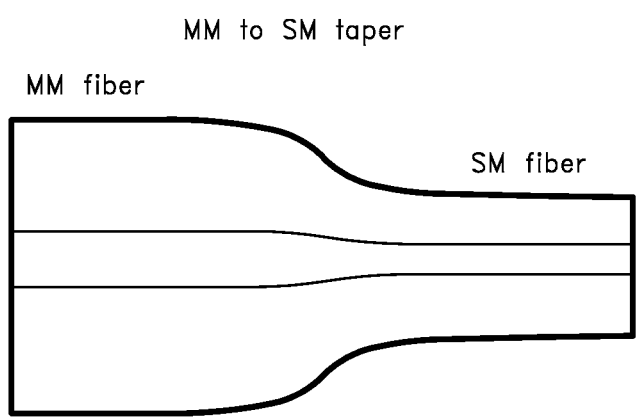

To ensure optimum matching of the fundamental mode of the multi-mode fiber 13 to the mode of the single-mode mode-filter fiber 15 in each of the embodiments of this invention, either a bulk optic imaging system, a splice between the multi-mode fiber 13 and the single-mode fiber 15, or a tapered section of the multi-mode fiber 13 may be used. For example, the multi-mode fiber 13, either in the form shown in one for FIG. 7A and FIG. 7B or in a non-polarization maintaining form may be tapered to an outside diameter of 70 μm. This produces an inside core diameter of 5.6 μm and ensures single mode operation of the multi-mode fiber at the tapered end. By further employing an adiabatic taper, the single-mode of the multi-mode fiber may be excited with nearly 100% efficiency. A graphic representation of the three discussed methods for excitation of the fundamental mode in an multi-mode fiber 13 with a single-mode fiber mode-filter 15 is shown in FIGS. 9A, 9B and 9C, respectively. The implementation in a cavity design is not shown separately, but the splice between the single-mode fiber 15 and the multi-mode fiber 15 shown in any of the disclosed embodiments may be constructed with any of the three alternatives shown in these figures.

Figure 10:
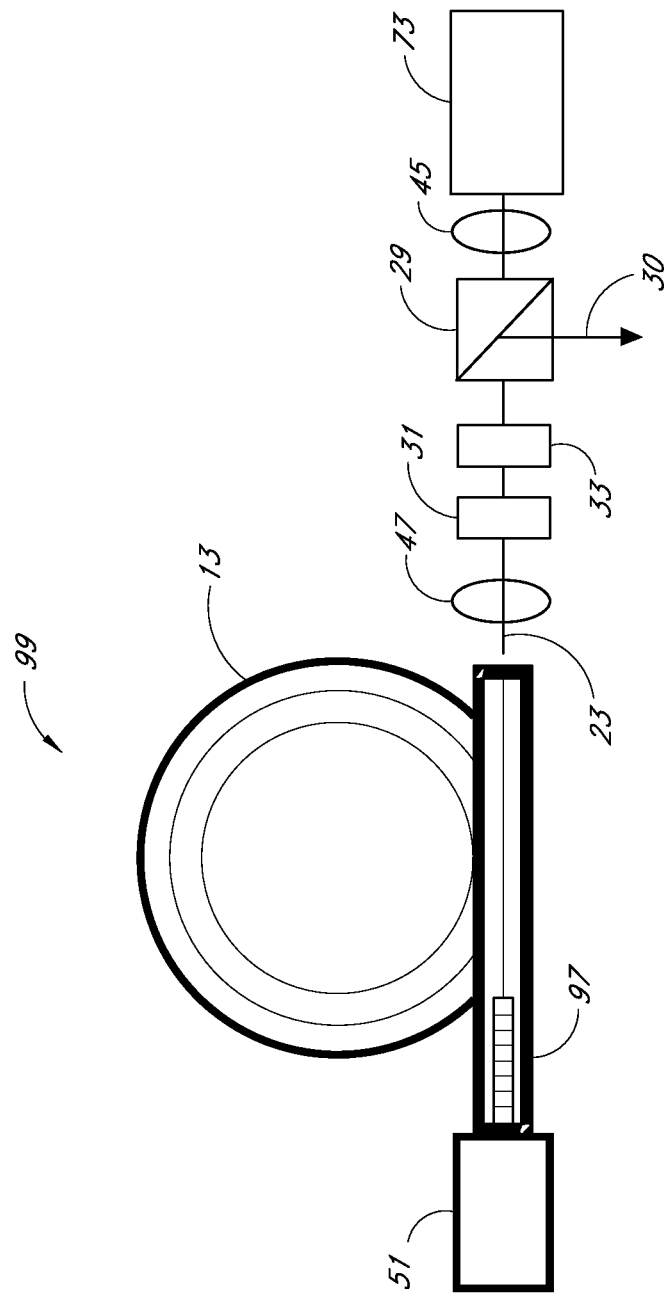
FIG. 10 is a schematic illustration of an alternative embodiment in which a fiber grating is used to predominantly reflect the fundamental mode of a multi-mode fiber.

FIG. 10 shows an additional embodiment of the invention. Here, instead of single-mode mode-filter fibers 15 as used in the previous embodiments, fiber gratings such as a Bragg grating directly written into the multi-mode fiber 13 is used to predominantly reflect the fundamental mode of the multi-mode fiber 13. Light from the pump 51 is injected through the fiber grating 97 to facilitate a particularly simple cavity design 99. Both chirped fiber gratings 97 as well as unchirped gratings can be implemented. Narrow bandwidth (chirped or unchirped) gratings favor the oscillation of pulses with a bandwidth smaller than the grating bandwidth.

Figure 11:
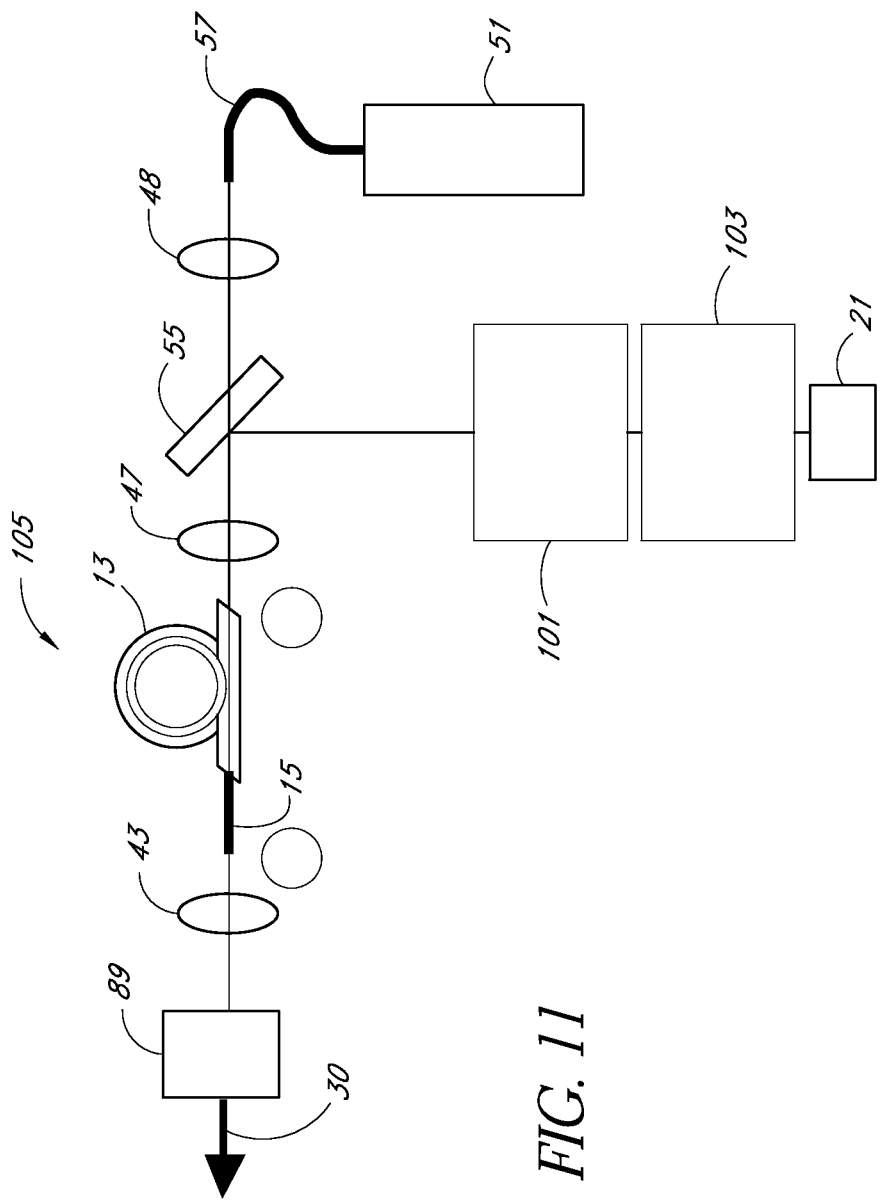
FIG. 11 is a schematic illustration of an alternative embodiment in which active or active-passive mode-locking is used to mode-lock the multi-mode laser.

Finally, instead of passive mode-locking, active mode-locking or active-passive mode-locking techniques may be used to mode-lock multi-mode fibers. For example, an active-passive mode-locked system could comprise an optical frequency or amplitude modulator (as the active mode-locking mechanism) in conjunction with nonlinear polarization evolution (as the passive mode-locking mechanism) to produce short optical pulses at a fixed repetition rate without a saturable absorber. A diagram of a mode-locked multi-mode fiber 13 with an optical mode-locking mechanism 101 is shown in FIG. 11. Also shown is an optical filter 103, which can be used to enhance the performance of the mode-locked laser 105.

Generally, the cavity designs described herein are exemplary of the preferred embodiments of this invention. Other variations are obvious from the previous discussions. In particular, optical modulators, optical filters, saturable absorbers and a polarization control elements are conveniently inserted at either cavity end. Equally, output coupling can be extracted at an optical mirror, a polarization beam splitter or also from an optical fiber coupler attached to the single-mode fiber filter 15. The pump power may also be coupled into the multi-mode fiber 13 from either end of the multi-mode fiber 13 or through the side of the multi-mode fiber 13 in any of the cavity configurations discussed. Equally, all the discussed cavities may be operated with any amount of dispersion. Chirped and unchirped gratings may be implemented at either cavity end to act as optical filters and also to modify the dispersion characteristics of the cavity.

What is claimed is:

1. A laser system, comprising:
   a length of doped multimode fiber having a first end;
   a pump source to pump said doped multimode fiber, said pump source arranged for cladding pumping said doped multimode fiber;
   a first length of single mode fiber; and
   reflectors disposed to form a laser cavity, said cavity comprising said doped multimode fiber and said first single mode fiber,
   wherein one end of said first single mode fiber is arranged with respect to said first end of said multimode fiber in such a way that a single mode of said single mode fiber is matched to a fundamental mode of said multimode fiber,
   wherein an output beam of said laser system is nearly diffraction limited and exits said multimode fiber from a second end of said multimode fiber opposite said first end; and
   a splice joining said first end of said multimode fiber and said first single mode fiber.

2. The laser system according to claim 1, further comprising a second length of single mode fiber optically connected to said second end of said multimode fiber, said second single mode fiber disposed opposite said first end of said multimode fiber and in said laser cavity.

3. The laser system according to claim 1, wherein matching of the fundamental mode of the multi-mode fiber to the mode of the single-mode fiber is carried out with a splice formed between the multi-mode fiber and the single-mode fiber.

4. The laser system according to claim 1, wherein matching a single mode of said single mode fiber to a fundamental mode of said multimode fiber produces an excitation of the fundamental mode in the multi-mode fiber with an efficiency of 99%.

5. The laser system according to claim 1, where an $M^2$ value of said nearly diffraction limited output beam is approximately 1.2.

6. The laser system according to claim 1, wherein at least one of the reflectors comprises a fiber Bragg grating or mirror.

7. The laser system according to claim 1, wherein said multimode fiber comprises a low-index polymer producing a numerical aperture for the cladding which exceeds a numerical aperture of the multimode fiber core.

8. The laser system according to claim 1, wherein said pump source is arranged for side pumping said doped multimode fiber.

9. The laser system according to claim 1, wherein the single- mode fiber excites the fundamental mode of the multimode fiber with an efficiency of approximately 90% to nearly 100%.

* * * * *